INVENTOR.
ALFRED FETZ

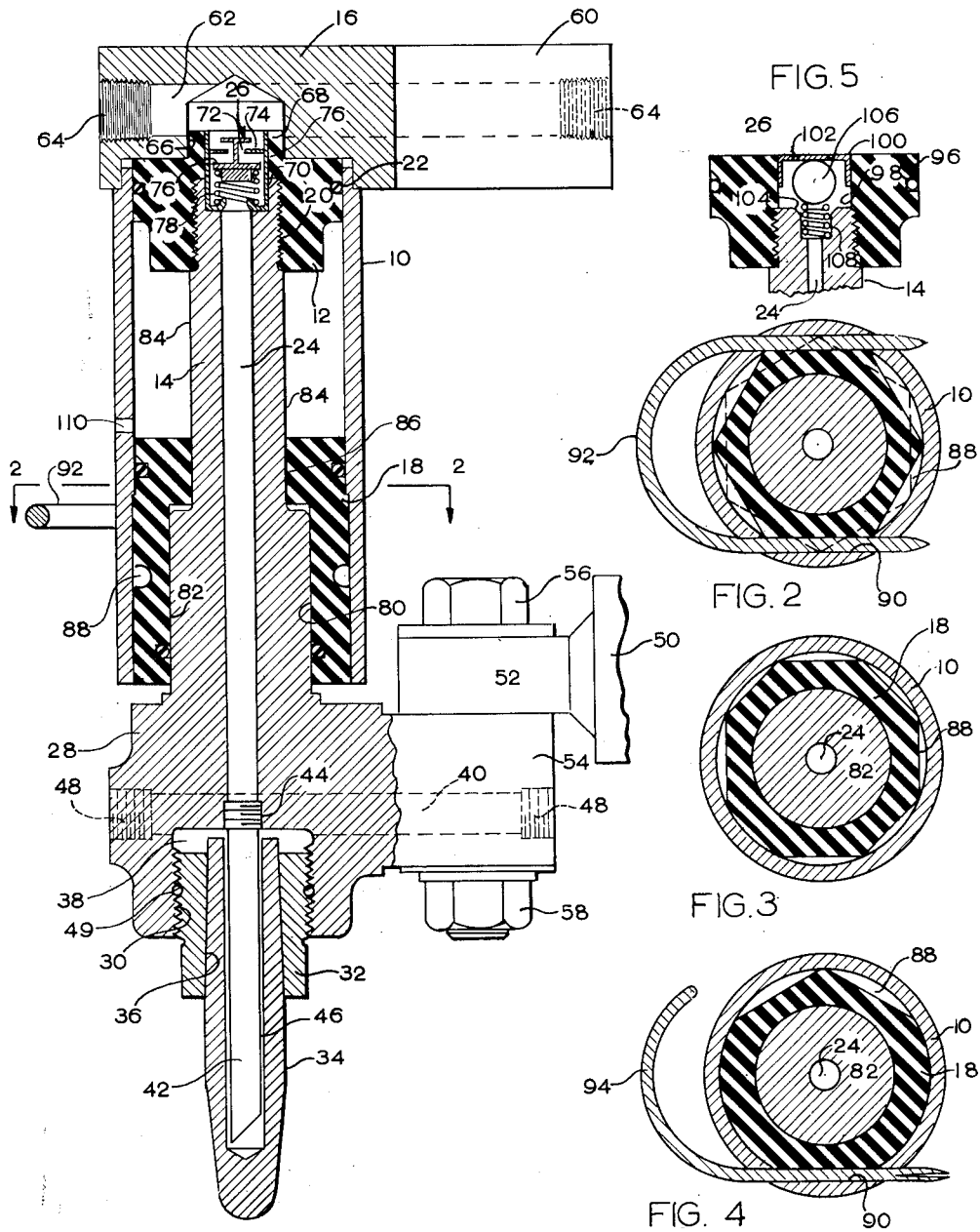

March 14, 1961 A. FETZ 2,975,264
WELDING ORGANIZATION
Filed May 28, 1958 20 Sheets-Sheet 3

INVENTOR.
ALFRED FETZ
BY
Barnes, Kisselle, Raisch & Choate

March 14, 1961 A. FETZ 2,975,264
WELDING ORGANIZATION
Filed May 28, 1958 20 Sheets-Sheet 4
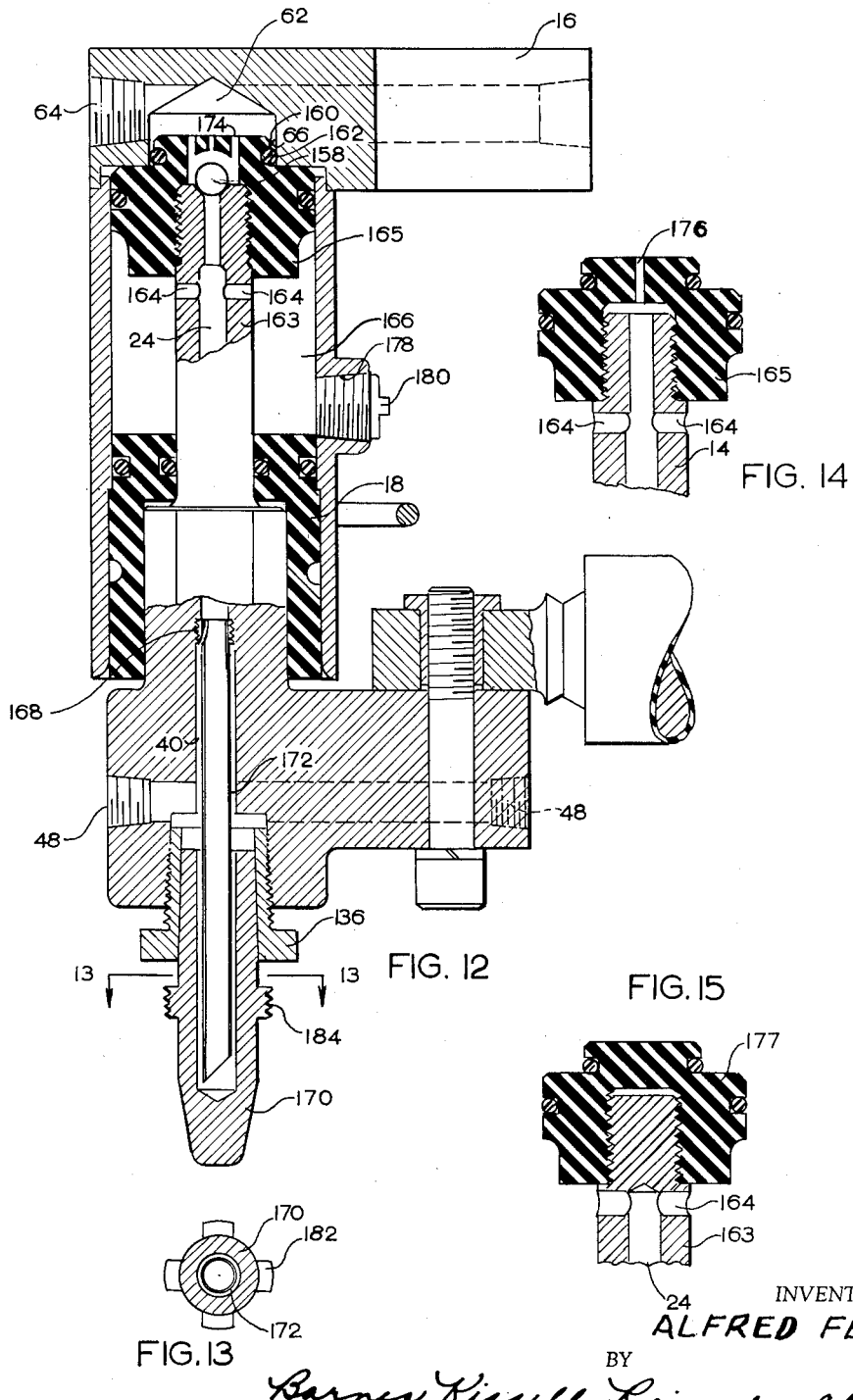

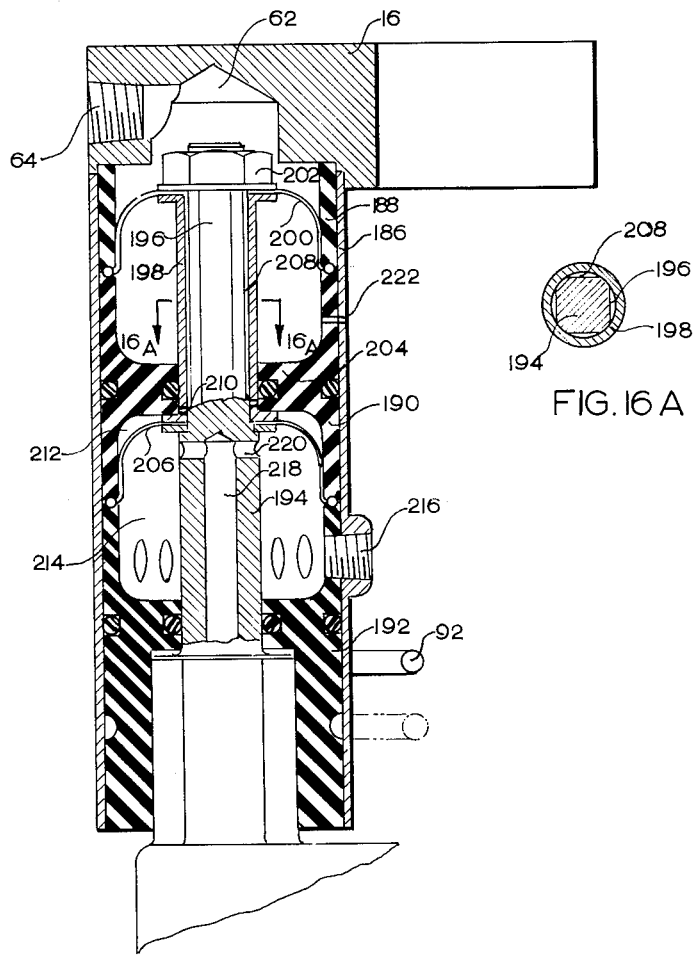

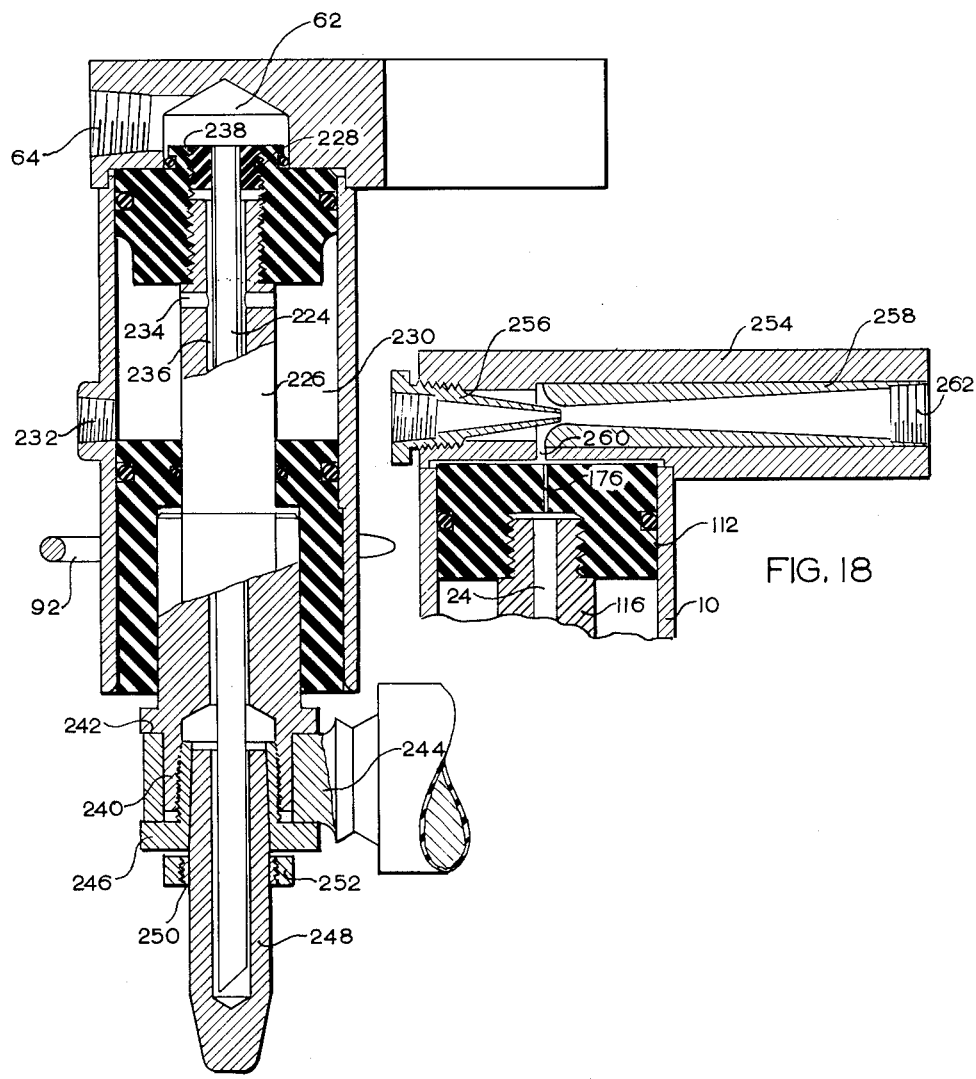

March 14, 1961   A. FETZ   2,975,264
WELDING ORGANIZATION
Filed May 28, 1958   20 Sheets-Sheet 7

INVENTOR.
ALFRED FETZ
BY
Barnes, Kisselle, Raisch & Choate

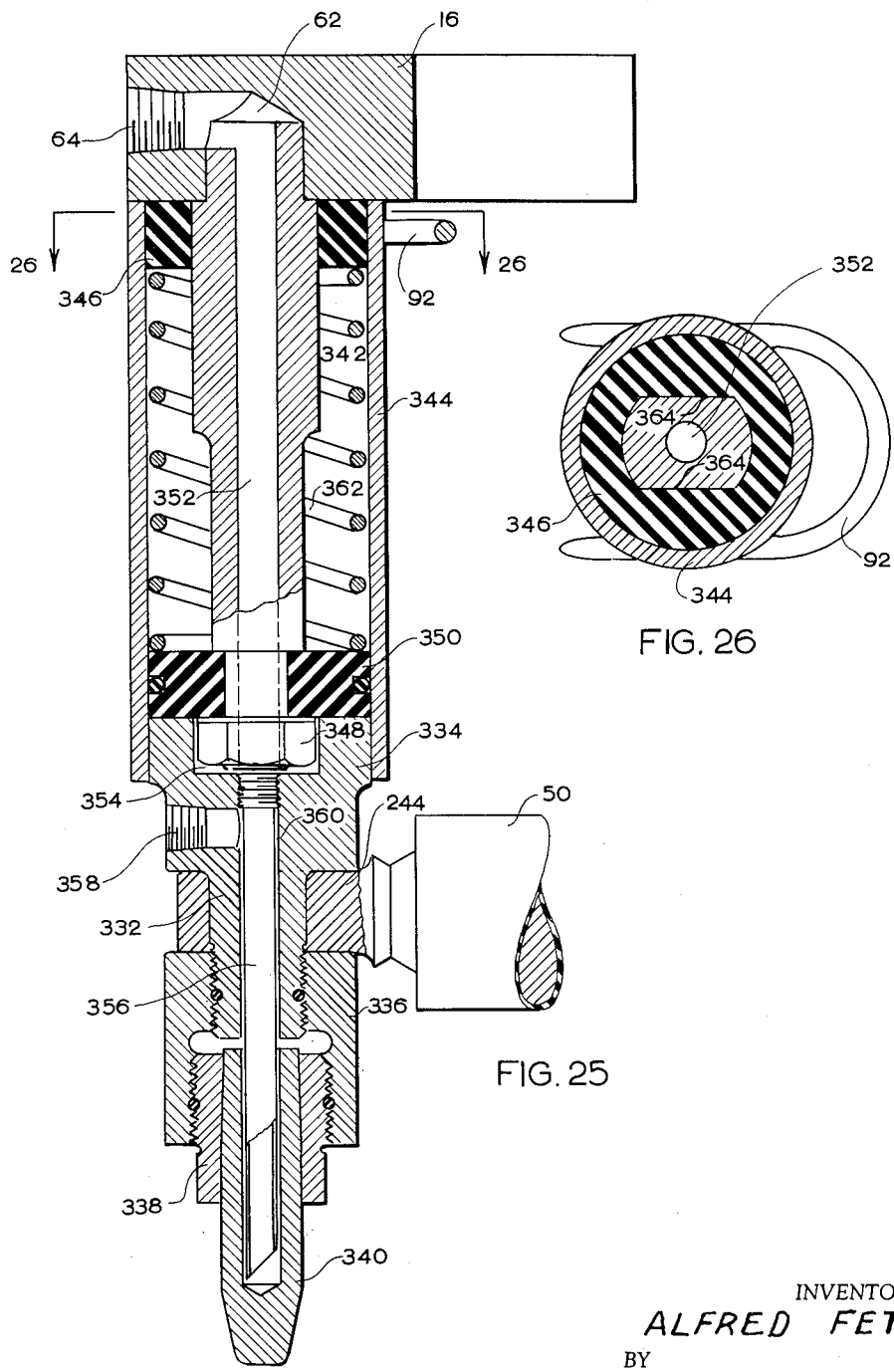

March 14, 1961 A. FETZ 2,975,264
WELDING ORGANIZATION
Filed May 28, 1958 20 Sheets-Sheet 10
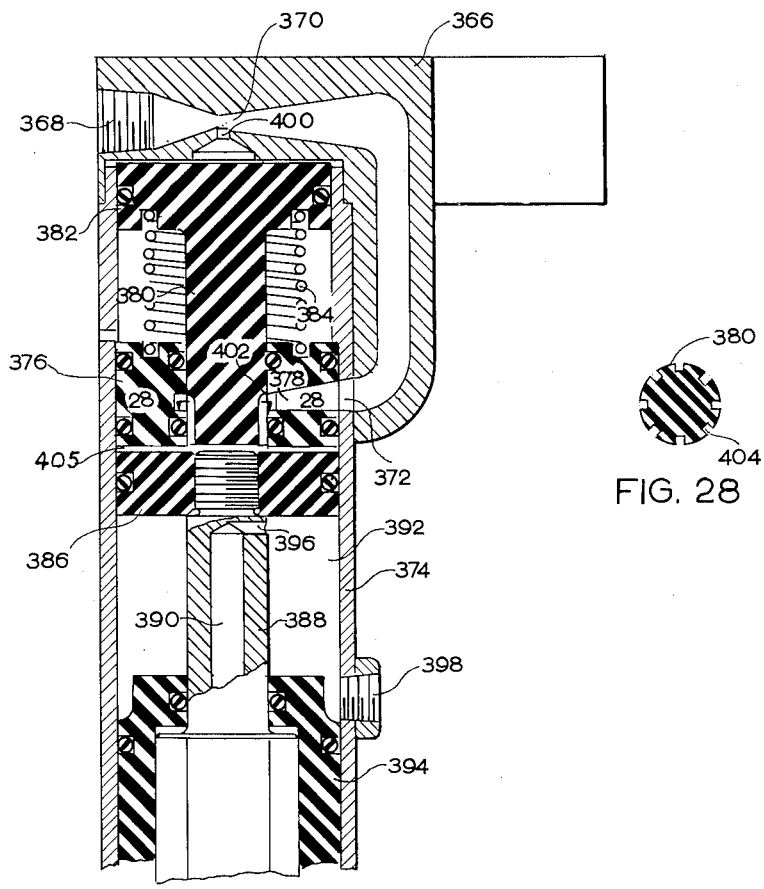
FIG. 27
FIG. 28
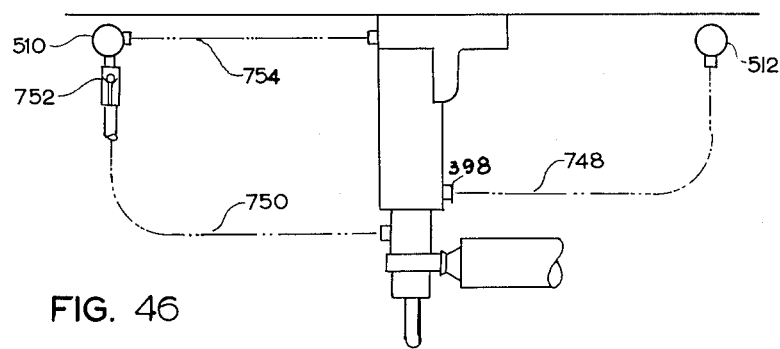
FIG. 46
INVENTOR.
ALFRED FETZ
BY
Barner, Kiselle, Raisch & Choate

INVENTOR.
ALFRED FETZ

INVENTOR.
ALFRED FETZ
BY
Barnes, Kisselle, Raisch & Choate

March 14, 1961  A. FETZ  2,975,264
WELDING ORGANIZATION
Filed May 28, 1958  20 Sheets-Sheet 13
FIG. 31
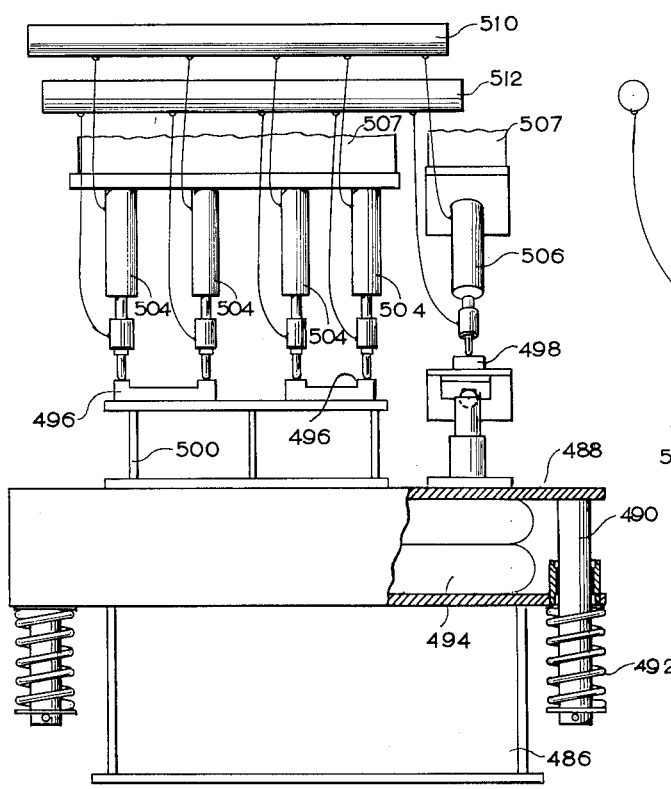
FIG. 32
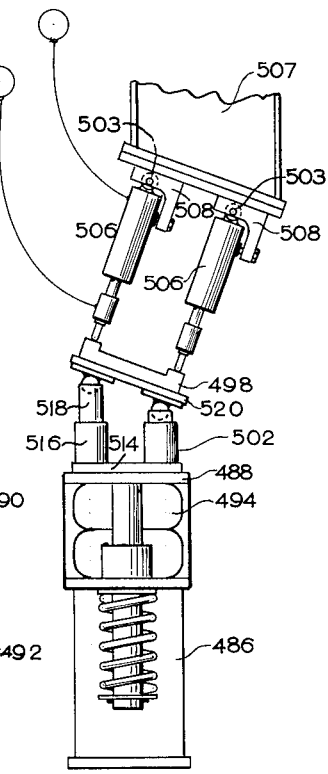
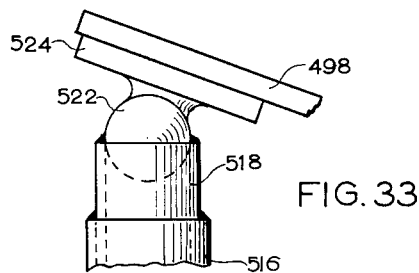
FIG. 33
INVENTOR.
ALFRED FETZ
BY
Barnes, Kisselle, Raisch & Choate March 14, 1961   A. FETZ   2,975,264
WELDING ORGANIZATION
Filed May 28, 1958   20 Sheets-Sheet 14

INVENTOR.
ALFRED FETZ
BY
Barnes, Kisselle, Raisch & Choate

March 14, 1961   A. FETZ   2,975,264
WELDING ORGANIZATION
Filed May 28, 1958   20 Sheets-Sheet 15

INVENTOR.
ALFRED FETZ
BY
Barnes, Kisselle, Raisch & Choate

March 14, 1961  A. FETZ  2,975,264
WELDING ORGANIZATION
Filed May 28, 1958  20 Sheets-Sheet 16

INVENTOR.
ALFRED FETZ
BY
Barney, Kiselle, Raisch & Choate

March 14, 1961 A. FETZ 2,975,264
WELDING ORGANIZATION
Filed May 28, 1958 20 Sheets-Sheet 17
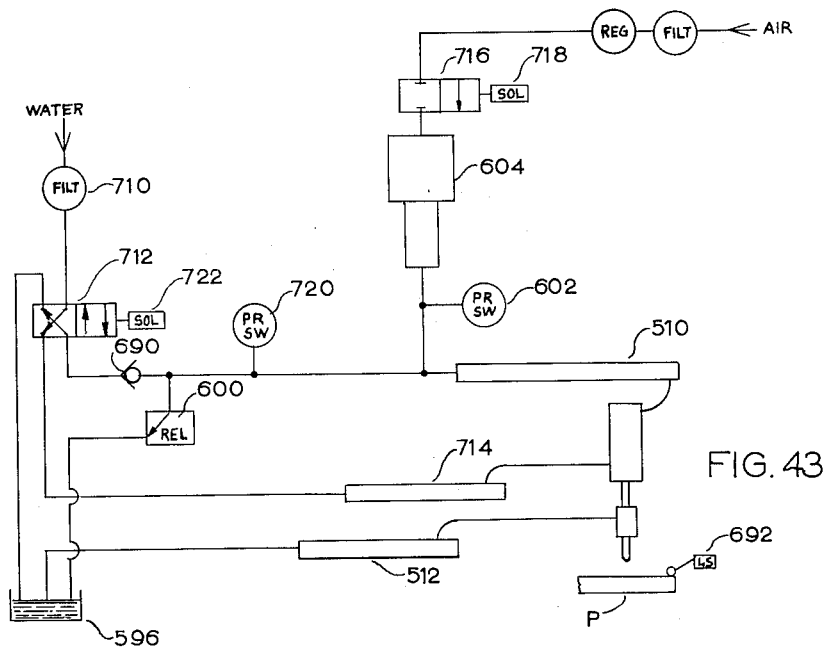
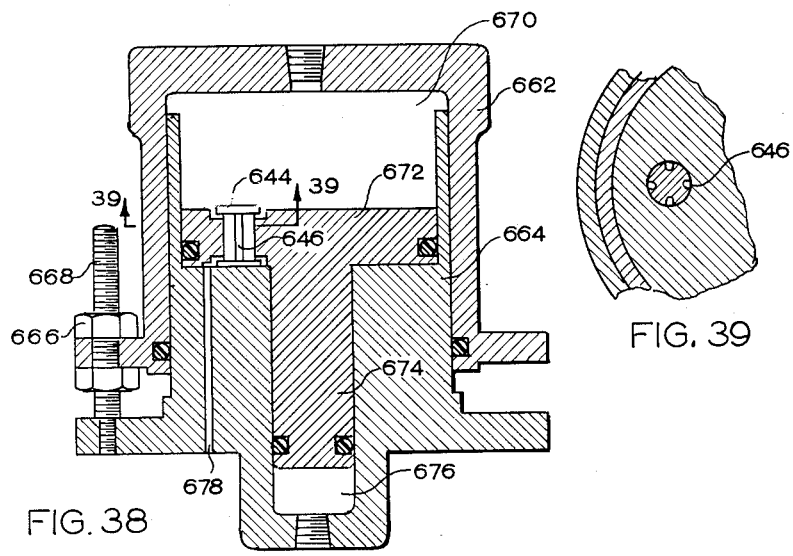
INVENTOR.
ALFRED FETZ
BY
Barnes, Kisselle, Raisch & Choate

INVENTOR.
ALFRED FETZ

March 14, 1961     A. FETZ     2,975,264
WELDING ORGANIZATION
Filed May 28, 1958     20 Sheets-Sheet 19

INVENTOR.
ALFRED FETZ
BY
Barnes, Kisselle, Raisch & Choate

March 14, 1961 A. FETZ 2,975,264
WELDING ORGANIZATION
Filed May 28, 1958 20 Sheets-Sheet 20

INVENTOR.
ALFRED FETZ
BY
Barnes, Kisselle, Raisch & Choate

20# United States Patent Office 2,975,264
Patented Mar. 14, 1961

2,975,264

WELDING ORGANIZATION

Alfred Fetz, 18905 Barlow, Detroit 5, Mich.

Filed May 28, 1958, Ser. No. 738,354

39 Claims. (Cl. 219—89)

This invention relates to a welding organization.

Welders used for production work are usually cooled in some manner to prevent overheating. In many instances, the electrodes, and sometimes other parts of the welding guns, are cooled by circulating water through them. Thus, in such arrangements, at least two water manifolds for a bank of welding guns are provided, one being an inlet manifold and the other being an exhaust manifold for the cooling water. Likewise, in many welding machines, the electrodes form part of a welding gun that includes a piston cylinder assembly actuated hydraulically. With such guns, a motor pump is employed for directing oil under relatively high pressures to the cylinders of the guns. This requires two additional manifolds so that in the ordinary hydraulically operated welding machine where the electrodes are water cooled, at least four manifolds are required and each gun has at least four hoses connected to it, two for water and two for oil. Such arrangements are not only needlessly expensive from the standpoint of original cost and maintenance but also present problems with respect to the placement of hoses in order to obtain a minimum desired clearance between adjacently positioned welding electrodes. The use of oil as the pressure medium also presents the danger of fires and usually results in a somewhat messy arrangement.

The present invention has for its primary object the provision of a welding organization wherein the number of manifolds required on the welding machine and the number of hoses required are materially reduced as compared with conventional machines described generally above.

This object of the present invention is accomplished by providing a welding organization wherein water may be used both for cooling purposes and as the pressure medium for actuating the guns. Thus, in a welding machine according to the present invention, the number of manifolds may be reduced to two, a water inlet manifold and a water exhaust manifold.

In addition, I have provided welding guns constructed so that the water supplied to the gun may be so directed through the gun to serve to cool the electrode and also apply the necessary pressure required for welding the work pieces so that the number of hoses connected to each gun may be also reduced to two.

The welding guns of the present invention also include other desirable features having to do with improved arrangements for connecting the welding cables to the gun and for mounting the electrode tips on the guns.

It will appreciaetd that a welding machine embodying the features described above is desirable not only from the standpoint of cost and compactness, but also from the standpoint of the elimination of the use of oil which, as pointed out above, is not only costly but also presents a fire hazard.

In the drawings:

Fig. 1 is a view in axial section of a welding gun constructed in accordance with the present invention.

Fig. 2 is a sectional view taken along the line 2—2 in Fig. 1.

Figs. 3 and 4 are sectional views showing modifications of the arrangement illustrated in Fig. 2.

Fig. 5 is a fragmentary sectional view showing a modified valve construction for the upper end of the piston rod of the gun illustrated in Fig. 1.

Fig. 12 is a view in axial section of another gun construction in accordance with the present invention that is of the double acting type.

Fig. 13 is a sectional view taken along the line 13—13 in Fig. 12.

Figs. 14 and 15 are fragmentary sectional views showing modified forms of construction for the upper end of the piston rod of the gun shown in Fig. 12.

Fig. 16 is a fragmentary view in axial section showing another form of gun constructed in accordance with the present invention.

Fig. 16A is a sectional view taken along the line 16A—16A in Fig. 16.

Fig. 17 is a view in axial section of another modified form of welding gun constructed in accordance with the present invention.

Fig. 18 is a fragmentary view in axial section of another modified form of gun construction according to the present invention.

Fig. 25 is a view in axial section of another gun constructed in accordance with the present invention, the gun there illustrated having a fixed piston and an axially movable cylinder.

Fig. 26 is a sectional view taken along the line 26—26 in Fig. 25.

Fig. 27 is a fragmentary sectional view of a gun in accordance with the present invention provided with a built-in booster.

Fig. 28 is a sectional view taken along the line 28—28 in Fig. 27.

Fig. 31 is a front elevation view, generally schematic and partly in section, showing a welding machine according to the present invention.

Fig. 32 is a side elevational view of the welding machine shown in Fig. 31.

Fig. 33 is a fragmentary detailed view showing a portion of the electrode back-up support arrangement of the machine illustrated in Figs. 31 and 32.

Figs. 35, 36 and 40 through 45 are circuit diagrams illustrating various welding systems incorporating the present invention.

Fig. 38 is a view in axial section of another form of booster usable in the welding systems of the present invention.

Fig. 39 is a sectional view taken along the line 39—39 in Fig. 38.

Fig. 46 is a generally schematic view illustrating the manner in which the gun shown in Fig. 27 is connected into the welding system of the present invention.

Figure 6:
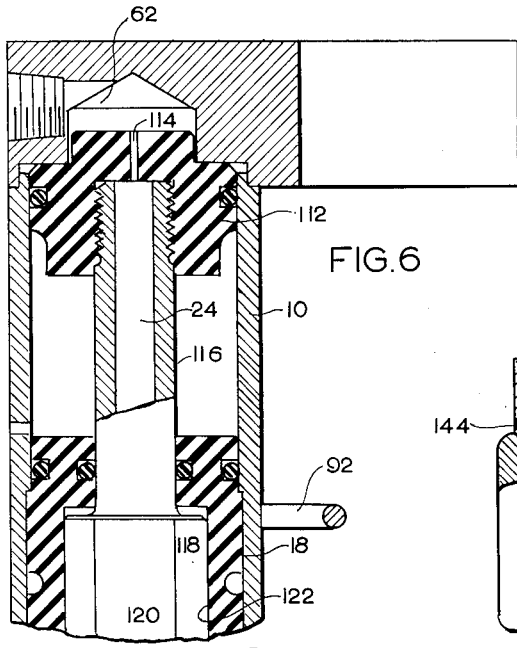
Fig. 6 is a fragmentary view in axial section of a gun similar to that shown in Fig. 1 and showing another form of valve construction for the upper end of the piston rod.

Referring now to Fig. 1 wherein one form of gun in accordance with the present invention is illustrated, the numeral 10 designates a cylinder in which is slidably arranged a piston 12 connected to a piston rod 14. The upper end of cylinder 10 is closed by a mounting bracket 16 and the lower end is closed by a bushing 18. Piston 12 and bushing 18 are formed from an electrically non-conducting material such as nylon. Piston 12 is threaded on the upper reduced end of piston rod 14 as at 20 and is provided with an O-ring seal 22 to prevent leakage between the piston 12 and the cylinder 10. Piston rod 14 has an axially extending passageway 24 therein. The flow of water through passageway 24 is controlled by a check valve assembly generally designated 26 at the upper end of the piston rod 14.

The lower end of piston rod 14 is in the form of an enlarged body portion 28 having an axially extending threaded socket 30 for receiving an electrode adapter 32. The electrode 34 is frictionally retained on adapter 32 by a tapered fit as at 36. Threaded socket 30 is counterbored as at 38 and communicates with a transverse passageway 40 in the enlarged body portion 28 of the piston rod. A deflector tube 42 having a threaded connection with the enlarged body portion 28 as at 44 forms an extension of passageway 24. The diameter of deflector tube 42 is less than the inner diameter of electrode 34 so as to provide a return passageway 46 for water into the counterbore 38 and out to passageway 40. Passageway 40 has threaded ports 48 at its opposite ends for connection with an exhaust water line. The exhaust water line, not illustrated, is connected to one of the ports 48 in accordance with the convenience of the arrangement; and the other port 48 is plugged. A nylon ring 49 in the threaded connection between adapter 32 and socket 30 forms a water-tight seal.

The welding cable 50 has a lug 52 at the end thereof which is clamped to the extension 54 of the enlarged body portion 28 of the piston rod by a bolt 56 and a nut 58.

The mounting bracket 16 is slotted as at 60 to facilitate mounting of the gun on a suitable support on the welding machine. Within bracket 16, there is formed a water inlet passageway 62 which terminates in threaded ports 64 at opposite ends thereof. To one of these ports, a water inlet line is connected, the other port being plugged. Passageway 62 is intersected by a transverse bore 66 into which a pilot portion 68 at the upper end of piston 12 is arranged to project.

The check valve assembly 26 extends through the pilot portion 68 and includes an outer casing 70 open at one end to the transverse water passageway 62 and open at its other end to the axially extending passageway 24 in piston rod 14. A port 72 in a radially extending wall 74 in the casing 70 is controlled by a valve member 76 which is normally retained in the open position by a spring 78. When the pressure of the water in passageway 62 exceeds the tension of spring 78, valve member 76 is urged downwardly to close port 72.

Bushing 18 is provided with a cylindrical bore 80 in which the cylindrical portion 82 of piston rod 14 is slidably arranged. The portion of piston rod 14 above the cylindrical portion 82 is fashioned with diametrically opposite flats 84, and the reduced opening 86 at the upper end of bushing 18 is correspondingly shaped so as to prevent relative rotation between the piston rod 14 and the bushing 18.

Means are provided for rotatably adjusting the enlarged body portion 28 of the piston rod 14 relative to the cylinder 10 so that the cable 50 can be rotated to the most desirable position. These means are best illustrated in Fig. 2. The bushing 18 is provided with two sets of axially spaced grooves 88, the grooves in each set being hexagonally arranged around the periphery of the bushing and the grooves in one set being staggered circumferentially with respect to the grooves in the other set. The cylinder 10 is provided with two sets of through apertures 90 that are spaced apart axially to correspond with the axial spacing between the two sets of grooves 88. A U-shaped pin 92 is adapted to be inserted through either of the two sets of openings 90 in cylinder 10 when registering with the grooves 88. Thus, the insertion of the pin 92 in either of the two sets of openings 90 enable positioning of the cable 50 in any of twelve different circumferentially spaced locations around the cylinder 10.

In the arrangement illustrated in Fig. 3, the grooves 88 are located to form an octahedron around the periphery of bushing 18; and in such an arrangement, with one set of grooves 88 and one set of openings 90, the cable 50 can be positioned in eight different positions circumferentially around the cylinder 10. In the arrangement illustrated in Fig. 4, the grooves 88 are only three in number and the pin 94 is provided with a single prong rather than a double prong as is the case with pin 92.

In Fig. 5, there is illustrated a check valve construction in the piston which is slightly different from that shown in Fig. 1. In the arrangement shown in Fig. 5, the piston 96 is provided with an axial bore 98, the upper end of which is partially closed by a cap 100 provided with apertures 102. At the upper end of passageway 24, the piston rod is formed with a seat 104 controlled by a ball 106 biased upwardly by a spring 108. The operation of the check valve shown in Fig. 5 is the same as that shown in Fig. 1.

In the gun illustrated in Fig. 1, when water at normal city pressure is directed into the passageway 62 of the mounting bracket 16, it flows downwardly through the check valve 26 and passageway 24 into the deflector tube 42. The water cools the tip 34 and then returns to exhaust through the clearance space 46 and passageway 40. If the pressure of the water in passageway 62 is relatively high, valve member 76 will be shifted downwardly against the tension of spring 78 to close port 72. Under this condition, the pressure of the water in the head chamber of the cylinder will act on the top side of piston 12 and force the piston axially downwardly in cylinder 10 to engage the electrode 34 with the work piece to be welded. The chamber below piston 12 is open to atmosphere through the port 110.

It will be observed that when it is desired to remove the electrode 34 from the gun illustrated in Fig. 1, the operator merely threads adapter 32 upwardly in socket 30 to cause the upper end of electrode 34 to engage the upper end of counterbore 38 and thus be ejected from adapter 32.

The gun illustrated in Fig. 6 is similar to that shown in Fig. 1 but differs therefrom primarily in two respects. Instead of employing a check valve assembly such as shown at 26 in Fig. 1, the piston 112 is provided with a small orifice 114 which acts as a valve and permits the flow of water from passageway 62 into passageway 24 at a restricted rate. In addition, the reduced upper portion 116 of the piston rod is cylindrically shaped while the enlarged portion 118 is formed with flats 120 on the side thereof. The bore 122 of bushing 18 is shaped to correspond with the cross sectional shape of the enlarged portion 118 so as to prevent relative rotation between the piston rod and bushing 18.

With the arrangement shown in Fig. 6, when the pressure of the water in passageway 62 rises to a value such that the flow cannot be accommodated entirely by orifice 114, a back pressure will be produced in chamber 62. This causes the electrode to engage the work piece to be welded with the required welding pressure. In this arrangement, it will be observed that water flows through the passageway 24 to cool the electrode at all times. In the arrangement shown in Fig. 1, when valve 76 closes port 72, the flow of coolant water to the electrode stops.

It should be pointed out at this time that with the guns illustrated in Figs. 1 and 6, the pistons normally gravitate downwardly into contact with bushings 19. However, as will be explained more fully hereinafter, in connection with the fluid systems described below, means are provided for moving the pistons upwardly in the cylinders 10.

Figure 7:
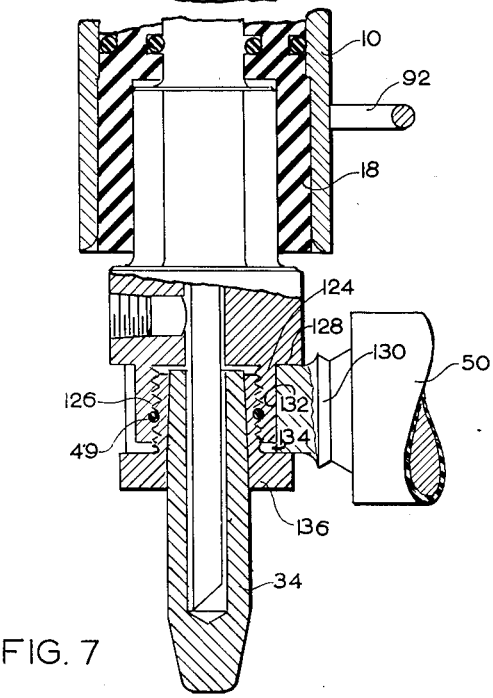
Fig. 7 is a fragmentary view in axial section of a gun similar to that shown in Fig. 1 and showing a modified construction for the electrode mounting and a modified form of cable connection.

In Fig. 7, there is illustrated a modified form of cable connection. In this arrangement, the lower end of the piston rod is fashioned with a reduced end portion 124 which is internally threaded as at 126. The formation of the reduced end portion 124 provides a shoulder 128 adjacent the lower end of the piston rod. The lug 130 of cable 50 is fashioned with a U-shaped slot 132. In assembly, lug 130 is slipped over the reduced end portion 124 and is clamped against the shoulder 128 by the adapter 136. The clearance between the shoulder of adapter 136 and the end of reduced end portion 124 is designated 134. The electrode 34 has a conventional tapered fit with adapter 136. In this arrangement, the pin 92 is utilized merely for holding the bushing 18 on the cylinder 10 and the rotative position of the cable 50 is adjusted by merely rotating the lug 130 about the reduced end portion 124 of the piston rod and then clamping it in place by means of the adapter 136.

Figure 8:
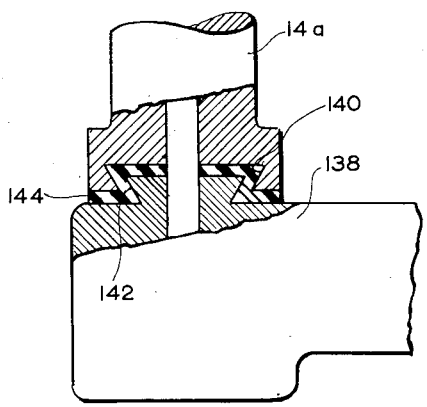
Figs. 8 and 9 are fragmentary views, partly in section, showing modified forms of construction for the lower ends of the piston rods shown in Figs. 1 and 7, respectively.

In Fig. 8, there is illustrated a slightly different arrangement for connecting the cable 50 to the piston rod. In this arrangement, the enlarged body portion 138, to which the cable is connected in the manner illustrated in Fig. 1, is formed separately from the piston rod 14. The end of piston rod 14a is fashioned with a dovetail slot 140, and the upper end face of the enlarged body portion 138 is formed with a dovetail guide 142. A molded rubber insert 144 is located between these members and the three members are cemented together. The insert 144 provides a follow-up action as close to the electrode tip as possible. In addition, the rubber insert 144 provides insulation and a water-tight connection between the members 138 and 14a.

Figure 9:
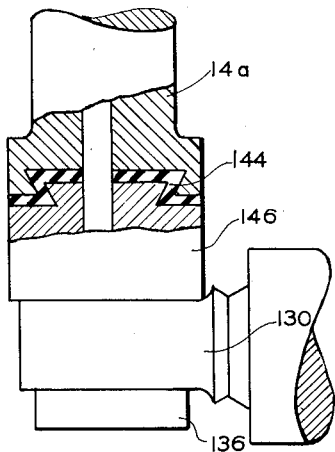

The general construction underlying the connection shown in Fig. 8 as applied to the arrangement shown in Fig. 7 is illustrated in Fig. 9. In this case, the rubber insert 144 is located between the lower end of piston rod 14a and the cylindrical extension 146 on which the cable lug 130 is clamped by means of adapter 136.

Figures 10, 11:
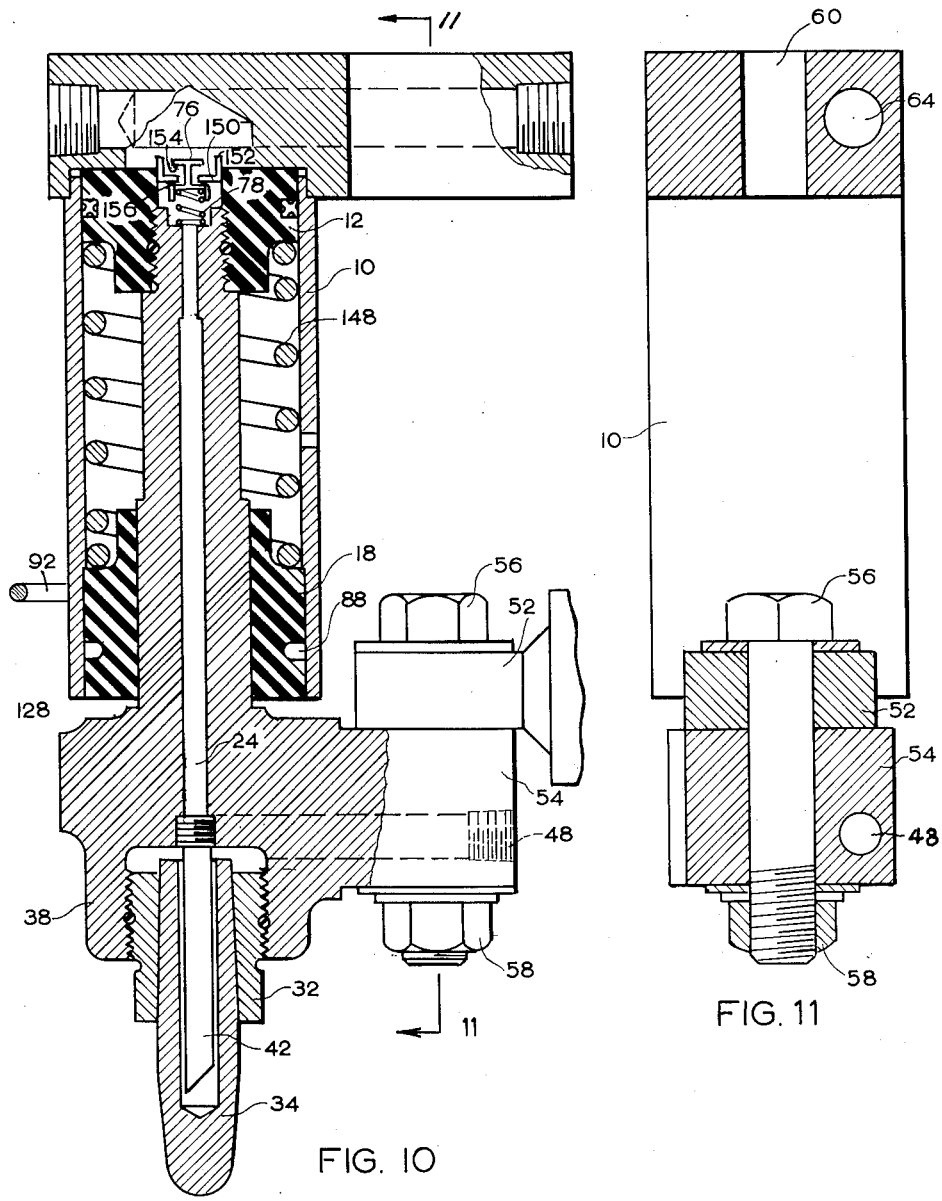
Fig. 10 is a view in axial section of a gun generally similar to that shown in Fig. 1 but provided with a spring for retraction of the piston rod.
Fig. 11 is a sectional view taken along the line 11—11 in Fig. 10.

The welding gun illustrated in Fig. 10 is in general constructed substantially the same as that shown in Fig. 1. The primary difference between the two welding guns resides in the fact that in the gun illustrated in Fig. 10, the piston is designed to be held in a normally retracted position by means of a spring 148 within cylinder 10 that acts between bushing 18 and piston 12. In addition, spring 78 is designed to urge valve member 76 upwardly against the wall 150 of cap 152 and substantially close port 154 even at the line pressure of the water. However, dimples 156 prevent valve member 76 from closing port 154 completely under the influence of spring 78 so that the water can normally flow down past the valve to cool the tip of the gun.

In Fig. 12, there is illustrated a double-acting gun that is constructed in accordance with the present invention. The term "double-acting" is used in the sense that the piston of the gun is hydraulically actuated in both directions. In this arrangement, a simple gravity-operated ball check 158 is provided at the upper end of the piston rod and the piston itself is provided with a pilot portion 160 that carries an O-ring 162 sealing with bore 66. Below the piston 12, the piston rod 163 is provided with transverse port 164 communicating between the axial passageway 24 and the chamber 166 between piston 165 and bushing 18.

Normally, when the gun is idle, water flows into one of the ports 48 (the other port 48 being plugged) into passageway 40. A portion of this water flows directly into the axial passageway 24 through the by-pass 168 and the other portion of the water flows downwardly to the electrode 170 and then up through the deflector tube 172 into passageway 24. The restriction of ports 174 at the upper end of piston 12 is greater than the restriction of ports 164 so that chamber 166 immediately fills with water to retract the piston. The by-pass 168 is provided to assist in quick retraction of the piston. While the gun is idle, the cooling water is exhausted therefrom through the port 64.

As will be described hereinafter, when the welding cycle is initiated, the flow of water is reversed so that it enters at port 64 rather than at port 48. This causes the ball check 158 to seat, thus closing the upper end of passageway 24 and causing the piston 165 to move downwardly. The water in chamber 166 is exhausted to port 48 through the ports 164, passageway 24, by-pass 168 and deflector tube 172 to passageway 40. It will be observed that by reason of the O-ring 162, upon initiation of the welding cycle, the water under pressure in passageway 62 acts on the reduced end of the piston 12 provided by the pilot portion 160 so that the response of the piston is rapid. The provision of the reduced pilot portion 160 is also desirable from the standpoint of reducing the back pressure on piston 165. In this connection the manifold connected with exhaust port 164 is preferably located at a level lower that the gun so that it will provide a siphoning action in chamber 62.

In Fig. 14, there is illustrated a slightly modified form of piston for the gun of Fig. 12. In this arrangement, instead of utilizing a ball check such as shown at 158 in Fig. 12, the upper end of the piston is provided with a restricted orifice 176. Thus, when the piston illustrated in Fig. 14 is substituted for that shown in Fig. 12, the welding electrode is cooled both during periods of idle and during the welding cycle. The size of orifice 176 is sufficiently small to create the necessary back pressure above the piston to cause the electrode to engage the work with the requisite welding pressure.

A further modification of the piston construction is illustrated in Fig. 15. In this arrangement, the piston 177 is closed entirely and there is no communication between the passageway 62 in the mounting bracket 16 and the axial passageway 24 in the piston rod. As will be described more fully hereinafter, when the piston illustrated in Fig. 15 is substituted for that shown in Fig. 12, the system requires the use of three manifolds; and the port 178 which is shown closed by the pipe plug 180 in Fig. 12 is connected with one of the manifolds.

The gun illustrated in Fig. 12 differs from the previous guns described also from the standpoint of the manner in which the electrode 170 is mounted on the gun. In this arrangement, the electrode is fashioned with a plurality of circumferentially spaced abutments 182 that are threaded as at 184. When a threaded turning tool is engaged with the threaded abutments 182 and advanced along the threads 184 so that the upper face of the turning tool engages the adapter 136, the electrode is ejected from its frictional engagement with adapter 136.

In Fig. 16, there is illustrated another welding gun according to the present invention which, in use, employs three manifolds, as will be described more fully hereinafter. Within the cylinder 186 of this gun are arranged three nylon bushings 188, 190 and 192. The upper end portion of the piston rod 194 is provided with a plurality of flat surfaces 196 and is surrounded by a sleeve 198 (Fig. 16A). A diaphragm 200 is clamped to the upper end of sleeve 198 by a nut 202. The outer periphery of diaphragm 200 is clamped between bushings 188 and 190 as illustrated. Bushing 190 is fashioned with a radial wall 204 which is centrally apertured to accommodate the sleeve 198. Below the wall 204, a second diaphragm 206 is clamped to the lower end of sleeve 198. The outer periphery of diaphragm 206 is clamped between bushings 190 and 192. The passageways 208 between sleeve 198 and the flattened areas 196 of piston rod 194 extend upwardly through nut 202 and communicate with the chamber 62 in the mounting bracket 16.

The lower end of sleeve 198 is provided with a plurality of apertures 210 which, in the retracted position of the piston rod, are closed by the intermediate wall 204. However, as the piston rod descends, the apertures 210 establish communication between the passageways 208 and the chamber 212 above diaphragm 206. The chamber 214 below diaphragm 206 is ported as at 216 for connection with a source of water for cooling the electrode and for retracting the piston. The lower portion of piston rod 194 is provided with an axially extending passageway 218 which communicates at one end with chamber 214 through the transverse ports 220. The lower end of passageway 218 directs water to the electrode for cooling purposes in the manner shown, for example, in Fig. 1 or Fig. 7.

The gun of Fig. 16 is incorporated into the welding machine by connecting the port 64 with a high-pressure water manifold, the port 216 with a water manifold at ordinary line pressure and the exhaust port on the electrode, not illustrated in Fig. 16, with an exhaust manifold. During idle periods, water at line pressure is admitted to chamber 214 through port 216. The pressure of the water in chamber 214 will flex the diaphragm 206 upwardly and retract the piston rod. The water will flow through ports 220 and axial passageway 218 to the tip of the electrode and then to exhaust to cool the electrode. During the welding cycle, water at relatively high pressure is admitted to the gun through port 64.

The high pressure of the water above diaphragm 200 will flex the diaphragm downwardly and cause the piston rod to be projected toward the work. The air below the diaphragm 200 will be exhausted through the vent 222. As the piston rod 194 moves down, ports 210 in sleeve 198 establish communication between passageways 208 and chamber 212. Thus, the water at high pressure also flows downwardly through passageways 208 and into chamber 212 and also acts upon the top side of diaphragm 206 so that the desired welding pressure will be exerted by the electrode on the work.

In the gun illustrated in Fig. 17, the deflector tube 224 is mounted in the piston rod 226 by means of a threaded bushing 228 threaded into the upper end of the piston. The deflector tube 224 thus communicates directly with the passageway 62, and the use of a valve in the piston is eliminated. The piston rod is retained in the retracted position by introducing water at ordinary line pressure to the rod chamber 230 below the piston through port 232. The pressure of the water in chamber 230 acts against the bottom side of the piston to urge the piston rod assembly upwardly to the position shown in Fig. 17. The water also flows through the radial ports 234 down through the axial passageway 236 to cool the electrode and then up through the deflector tube 224 to exhaust through port 64.

During the welding cycle, the flow of water is reversed and water under relatively high pressure is introduced at port 64. The restriction of the passageway 236 and ports 234 is sufficient to create the desired back pressure so that the pressure of the water acting on the top side of the piston, initially on the top side of the pilot portion 238 will shift the piston rod downwardly against the work and exert the desired welding pressure.

In Fig. 17, there is also illustrated a modified construction for the cable connection and ejection of the electrode. As shown, the lower end of piston rod 226 is formed with an internally threaded cylindrical extension 240 defined at one end by a shoulder 242. The cable lug 244 is apertured to slip over the piston rod extension 240. The tip adapter 246 threads into extension 240 and clamps the cable lug 244 against the shoulder 242. The electrode tip 248 has a tapered friction fit with adapter 246. Below the adapter, electrode 248 has a threaded enlargement 250 on which a nut 252 is threaded. The enlargement 250 is located sufficiently close to the lower end of adapter 246 such that when the nut 252 is advanced upwardly, it contacts the lower end of adapter 246 and thus serves to eject the tip from the adapter.

In Fig. 18, I have illustrated a gun which embodies the present invention and operates on the venturi principle. In this arrangement, the mounting bracket 254 is provided with a jet nozzle 256 and a sleeve 258 to provide a venturi. The piston rod 116 with the piston 112 provided with the restricted orifice 176 as illustrated in Fig. 14 is retracted and held in the retracted position by introducing water at ordinary line pressure to the jet nozzle 256. The water flowing through the venturi creates a suction at port 260 to thus urge the piston 112 upwardly. The water discharged from sleeve 258 is directed to a water manifold which is also connected with a coolant port at the lower end of the piston rod such as the port 48 illustrated in Fig. 1. The latter port communicates with the axial passageway 24 illustrated in Fig. 18 so that a back pressure is created at restriction 176 to assist in the retraction of the piston and the piston rod.

During the welding cycle, the flow of water is reversed so that water under relatively high pressure is directed to the top side of piston 112 through the port 262, sleeve 258 and port 260. This relatively high pressure is exerted against the top side of piston 112 to shift the piston and the piston rod downwardly in the cylinder 10 so that the electrode will be brought to bear against the work with the desired welding pressure. A small amount of water will bleed through the restriction 176 to cool the electrode even during the welding cycle.

Figure 19:
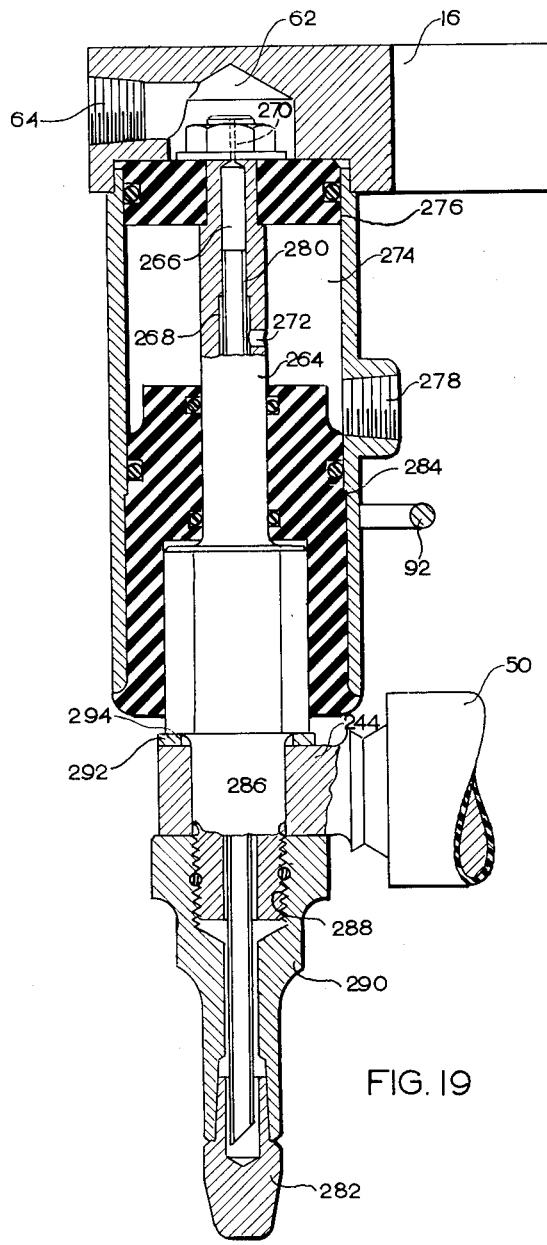
Fig. 19 is a view in axial section of another modified form of gun construction according to the present invention.

In the gun illustrated in Fig. 19, the piston rod 264 is provided with an axial passageway 266 which is enlarged as at 268. The upper end of passageway 266 is restricted as at 270. The enlarged portion 268 of the passageway 266 communicates by means of a port 272 with the chamber 274 below piston 276. Chamber 274 is ported as at 278 for connection with a water manifold.

Upon initiation of the welding cycle, water at relatively high pressure is introduced through port 64 into passageway 62. This water exerts a downward pressure on the top side of piston 276 to urge the piston and the piston rod downwardly. A portion of this water flows through restriction 270 into passageway 266 and then through the deflector tube 280 to the electrode tip 282. The water then flows upwardly through the enlarged portion 268 of the axial passageway in the piston rod and out through port 272 into rod chamber 274 and to exhaust through port 278. However, as soon as the piston rod moves downwardly a sufficient amount so that the port 272 is closed by the nylon bushing 284, the flow of water through the deflector tube 280 ceases and the pressure of the water flowing into the gun through port 64 is exerted exclusively against the top side of piston 276.

When the welding cycle is completed, the flow of water is reversed and water at ordinary line pressure is introduced to the gun at port 278. This water acts against the underside of piston 276 to initiate the retraction stroke; and as soon as the piston rod 264 moves upwardly a sufficient distance to uncover port 272, the water also flows down through the enlarged passageway 268 to cool the electrode tip 282 and then up through the deflector tube 280 and back to exhaust through port 64.

There is also shown in Fig. 19 a further modification of the manner in which the cable 50 may be secured to the end of the piston rod. In this arrangement, the piston rod is provided with a cylindrical extension 286 which is threaded as at 288. The cable lug 244 is apertured so that it can be slipped over the extension 286. The electrode adapter 290, the upper end of which is formed as a nut, is arranged to be threaded over the threaded portion 288 of the piston rod extension to thereby clamp the cable lug 244 in position. A washer or spacer 292 may be arranged between the shoulder 294 of the piston rod and the top face of cable lug 244.

Figure 20:
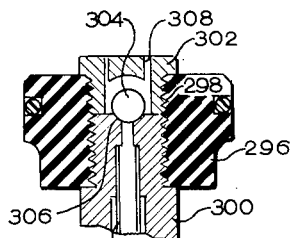
Figs. 20 and 21 are fragmentary sectional views showing modified forms of valve constructions for the upper end of the piston rod of the gun illustrated in Fig. 19.

Fig. 20 shows a modified construction for the piston of the gun illustrated in Fig. 19. The piston 296 of Fig. 20 is threaded as at 298 to receive the upper end of the piston rod 300 and also to receive a cap 302. A ball check 304 is arranged within cap 302 and normally closes with a valve seat 306 at the upper end of piston rod 300. Cap 302 is provided with small orifices 308 for permitting the flow of water between the deflector tube 280 and the passageway 62 in the mounting bracket 16. With the arrangement shown in Fig. 20, if the orifices 308 should become plugged, the cap 302 can be removed and replaced with a new one.

Figure 21:
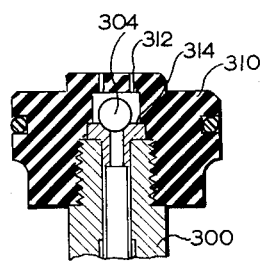

A further modified form of piston construction is shown in Fig. 21. In this arrangement, the piston 310 is itself fashioned with restricted orifices 312 and is threaded at the upper end of the piston rod 300 as shown. A valve insert 314 is held on the upper end of the piston rod by piston 310. In this arrangement, should the orifices 312 become plugged or the valve become inoperative for some other reason, the whole piston assembly is removed from the piston rod 300 and replaced with a new one.

Figure 22:
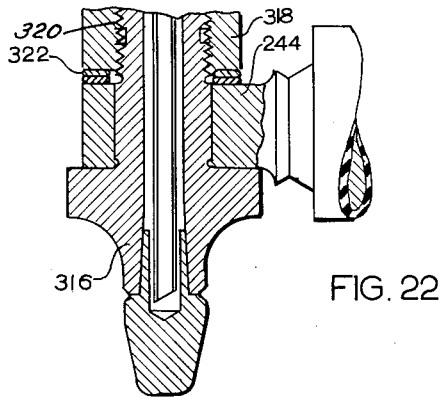
Fig. 22 is a generally sectional view showing a modified form of construction for attaching the welding cable to the electrode of the gun.
Figure 23:
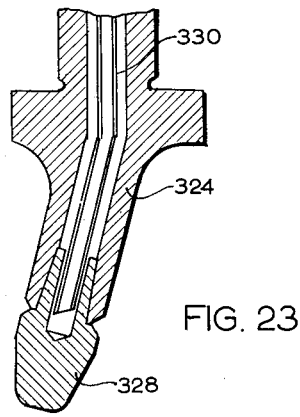
Figs. 23 and 24 are sectional views showing modified forms of electrode adapters.
Figure 24:
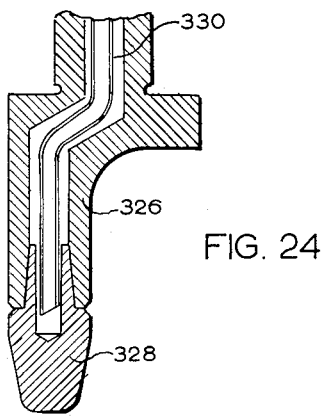

Figs. 22 through 24 show further modified arrangements for connecting the cable to the lower end of the piston rod. In the arrangement shown in Fig. 22, the cable lug 244 is mounted directly on the electrode adapter 316 which is in turn threaded into the lower end of the piston rod 318 as at 320. Spacers 322 are arranged between the lower end of piston rod 318 and the top face of cable lug 244.

The arrangements shown in Figs. 23 and 24 are generally the same as that shown in Fig. 22. However, the electrode adapter 324 shown in Fig. 23 has its axis inclined to the axis of the piston; and the adapter 326 shown in Fig. 24 has its axis offset from the axis of the piston rod. To properly locate the electrode tips 328 in the arrangements shown in Figs. 23 and 24, spacers 322 are selected of suitable thickness so that when the adapter is screwed tightly into the end of the piston rod, the tip 328 will be located in the desired rotative position. In connection with the arrangements shown in Figs. 23 and 24, the deflector tube 330 shown therein can be made of a flexible material such as plastic so that it can assume the proper bent configuration.

Another means for connecting the cable 50 to the gun is shown in Fig. 25. In this arrangement, the cable lug 244 fits over the lower reduced end 332 of the cylinder end closing member 334. A nut 336 is utilized for clamping the cable lug 244 on the lower end of the end member 334. Adapter 338 is threaded into the lower end of nut 336. Electrode 340 has a taper fit with adapter 338. When it is desired to remove electrode 340 from adapter 338, the adapter is threaded into the nut 336 until the upper end of electrode 340 engages the end face of the portion 332 of cylinder end member 334 so that the electrode will be automatically released from its tapered fit with the adapter 338.

The gun illustrated in Fig. 25 also differs from those previously shown in that the piston rod 342 is stationary and the cylinder 344 slides axially of the piston rod. The upper end of cylinder 344 is closed by a bushing 346 which slidably engages the piston rod. At the lower end of piston rod 342, there is mounted as by a nut 348 a piston 350. Piston rod 342 is provided with an axially extending passageway 352 which communicates at one end with the passageway 62 in mounting bracket 16. At its other end, passageway 352 extends through nut 348 and communicates with the chamber 354 formed in the cylinder end member 334. The deflector tube 356 is threaded into member 334 so that at its upper end, it communicates with chamber 354. Member 334 is provided with a port 358 which communicates with the passageway 360 surrounding the deflector tube 356. The cylinder 344 is normally retained in the retracted position illustrated in Fig. 25 by means of a spring 362 acting between bushing 346 and piston 350.

When the gun is idle, water at ordinary line pressure is directed through the port 64 in the mounting bracket 16. This water flows downwardly through axial passageway 352 througuh the deflector tube 356 and then out to exhaust through port 358. If desired, during idle, cooling water may be admitted through port 358, instead. When the welding cycle is initiated, the pressure of the water directed through port 64 is increased to a relatively high value. The water at high pressure flows through axial passageway 352 and into chamber 354. A portion of this water flows through the deflector tube 356; but in view of the restriction around the deflector tube 356, the pressure of the water in chamber 354 is sufficient to act against the lower face of piston 350 and compress spring 362 so as to slide the cylinder assembly downward and bring the electrode 340 into pressure engagement with the work.

The pin 92 interconnects bushing 346 with cylinder 344 to prevent rotation of the cylinder on the piston rod 342. Referring to Fig. 26, it will be observed that the piston rod is formed with flats 364 along diametrically opposite sides thereof, and the aperture in bushing 346 corresponds with the cross sectional shape of the piston rod 352 to prevent relative rotation between the bushing 346 and the piston rod.

It will be observed that with respect to the welding guns illustrated in Figs. 1, 7, 10, 12 and 17, the electrical connection between the cable lug and the electrode is completed at least to a large extent through the lower end of the piston rod. Thus, in these guns, the piston rod should be made from a copper alloy so that it will have good electrical conducting properties. However, in the guns illustrated in Figs. 19 and 25, there is a sufficiently great area of contact between the cable lug and the adapter so that the current flows directly from the cable lug to the adapter. Thus, with the guns illustrated in Figs. 19 and 25, the piston 264 and the cylinder head 334 can be formed of an alloy steel.

In addition, it should be noted that the cable clamping arrangements shown in Figs. 7, 17 and 19 and 22 through 25 are from at least one standpoint more desirable than the cable clamping arrangements shown in Figs. 1, 10 and 12. In welding machines, it is desirable to have the current conducting cables as flexible as possible without increasing the path of travel of the current. In the arrangements illustrated in Figs. 7, 17, 19 and 22 through 25, the cable lug is connected to the gun very close to the electrode. Thus, the cable is longer and more flexible and the path of travel of the current is no longer than with the cable arrangements shown in Figs. 1, 10 and 12. In addition, it will be observed that with the cable connections shown in Figs. 7, 17, 19 and 22 through 25, the cable clamping means are located directly adjacent the cooled portion of the electrode. This maintains the cable clamps at a lower temperature and reduces breakage at this point.

Figure 29:
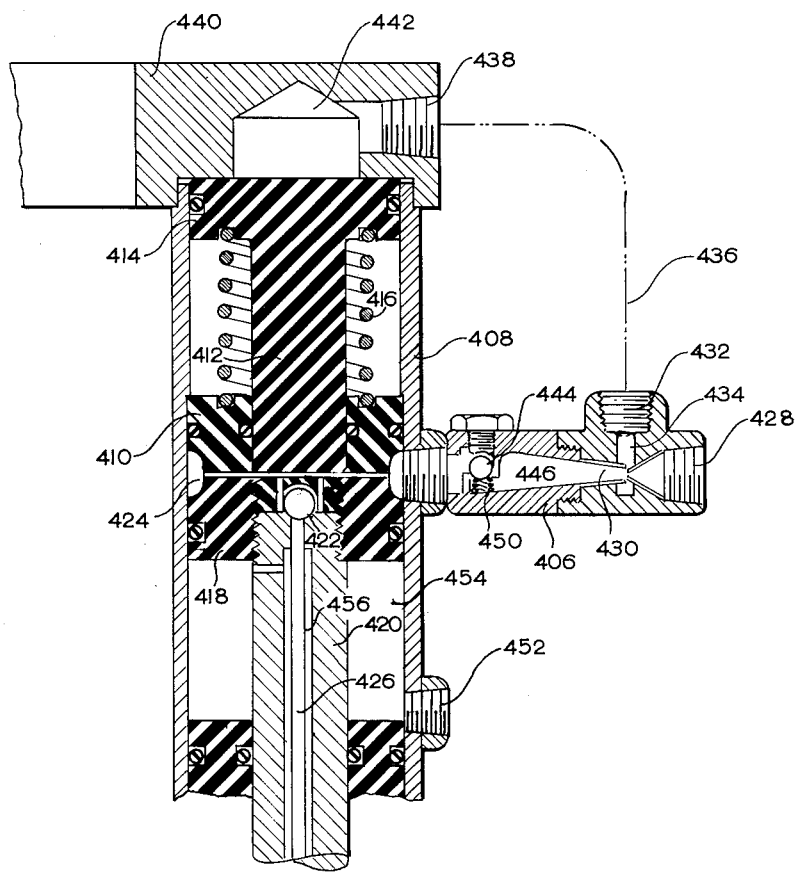
Figs. 29 and 30 are views similar to Fig. 27 and showing two additional guns with built-in boosters.

The guns illustrated in Figs. 27 and 29 are in some respects similar to that shown in Fig. 18 in that all of these guns employ the venturi principle. The guns shown in Figs. 27 and 29 differ from that shown in Fig. 18 primarily in that the two latter guns incorporate a booster within them. In the gun shown in Fig. 27, the mounting bracket 366 has an inlet port 368 that communicates with a venturi passageway 370, the outlet of which registers with a port 372 in the cylinder 374. Within cylinder 374, there is arranged a stationary bushing 376 which has a chamber 378 communicating with port 372. The bushing 376 is centrally apertured to guide the reduced plunger portion 380 of a booster piston 382. Piston 382 is normally biased upwardly to the upper end of cylinder 374 by a spring 384.

Below bushing 376, there is slidably arranged within cylinder 374 an operating piston 386 connected to the upper end of a piston rod 388. The lower end of piston rod 388 has an electrode mounted thereon, and the welding cable is connected thereto in the manner illustrated, for example, in Fig. 12. Piston rod 388 has an axially extending cooling passageway 390 that communicates with the rod chamber 392 between piston 386 and bushing 394 by means of a transverse port 396. Chamber 392 is ported as at 398.

When the gun is idle, piston 386 is retained in the retracted position by admitting water at ordinary line pressure through port 398 which urges the piston 386 upwardly to the position shown and which, at the same time, flows downwardly through passageway 390 to cool the electrode. When the welding cycle is initiated, water at a relatively high pressure is directed to port 368. This water flows through the venturi passageway 370 to the port 372. The water then flows through chamber 378 to the top side of piston 386. When the electrode contacts the work, further substantial downward movement of piston 386 is prevented so that the water under relative high pressure then begins to flow from the venturi passageway 370 through the by-pass 400 and to the top side of piston 382.

Piston 382 thus moves downwardly to a point where the shoulders 402 defining the upper ends of the axial slots 404 (Fig. 28) cut off communication between chamber 378 and the top side of piston 386. Thus, as the piston 382 continues to move downwardly, the water in the chamber 405 between the top side of piston 386 and the lower face of bushing 376 is subjected to a substantial increase in pressure so that the welding pressure at the electrode tip is multiplied to a relatively high value.

In the gun illustrated in Fig. 29, a venturi fitting 406 is mounted on the side of cylinder 408. Within the cylinder, there is arranged a stationary bushing 410 which is apertured to receive the plunger portion 412 of a booster piston 414. Piston 414 is normally biased to the upper end of cylinder 408 by a spring 416. Beneath the bushing 410, there is arranged within cylinder 408 a piston 418 which is connected to a piston rod 420. The upper end of the piston rod is provided with a check valve 422 for controlling communication between the chamber 424 and the deflector tube 426. The main operating piston assembly of the gun illustrated in Fig. 29 is substantially the same as that shown in Fig. 7 with the exception, however, that the gun illustrated in Fig. 7 does not incorporate a check valve.

The venturi fitting 406 has an inlet port 428 that connects with a venturi passageway 430. Branch port 432 communicates by way of a passageway 434 with the throat of venturi passageway 430. A conduit 436 connects port 432 with the port 438 on the mounting bracket 440. Port 438 is in open communication with the top side of piston 414 by way of head chamber 442. At the downstream end of venturi passageway 430, there is arranged a ball check 444. Ball check 444 is biased upwardly in a direction away from seat 446 by a spring 450.

When the gun is idle, piston 418 is retracted and maintained in the retracted position illustrated by directing water under ordinary line pressure through the port 452. The water flows into rod chamber 454 and exerts pressure against the lower face of piston 418 to move the piston 418 upwardly. The water then flows through axial passageway 456 through the electrode, then up through deflector tube 426 past ball check 422 and into chamber 424. From chamber 424, this water at ordinary line pressure then flows into fitting 406. It flows past ball check 444 since spring 450 is designed to hold ball check 444 open under line pressure. The water flows to exhaust from fitting 406 through port 428.

When the welding cycle is initiated, water at a relatively high pressure is directed to port 428 of fitting 406. The water flows through venturi passageway 430 and past ball check 444 into chamber 424. Ball check 422 seats and the piston 418 is thus caused to move downwardly. After the electrode contacts the work piece, the pressure in chamber 424 builds up to a point where the water admitted through port 428 flows through the passageway 434 and conduit 436 to the top side of piston 414. Piston 414 is thus urged downwardly and the differential area of the two opposite ends thereof causes a substantial increase in pressure in chamber 424 which overcomes the setting of spring 450 and causes ball check 444 to close. When ball check 444 closes and piston 414 continues to move downwardly against the tension of spring 416, the pressure in chamber 424 is further increased, the net result of which is the application of relatively high welding pressure by the tip of the electrode.

Figure 30:
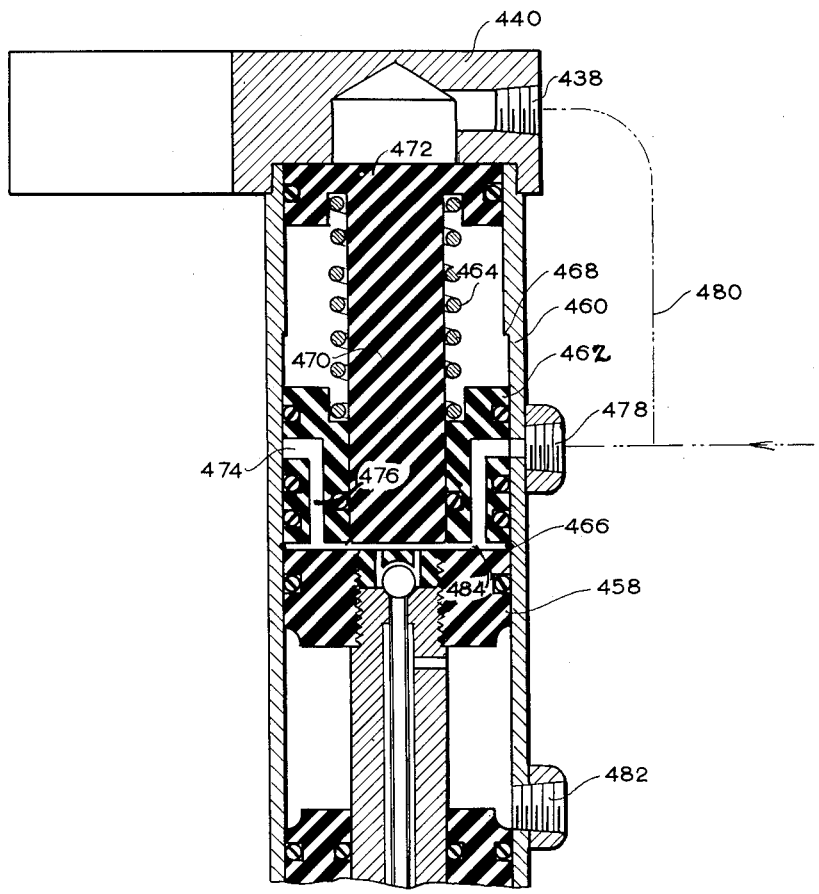

In the gun illustrated in Fig. 30, the electrode operating piston assembly generally designated 458 is the same as that illustrated in Fig. 29. However, in this arrangement, there is located within cylinder 460 above the piston assembly 458 a free sliding piston 462. Piston 462 is normally biased downwardly by a spring 464 against a stop ring 466. Its movement upwardly is limited by a shoulder 468 within the cylinder. Piston 462 is centrally apertured to form a guide for the plunger portion 470 of a booster piston 472 against the underside of which spring 464 abuts. Piston 462 is provided with an annular passageway 474 that communicates with an axially extending passageway 476 that is open at the lower end of the piston. In the lowermost position of piston 462, the annular passageway 474 communicates with a port 478 at one side of the cylinder. Port 478 is connected by means of a conduit 480 with the port 438 in the mounting bracket 440.

When idle, the piston assembly is retracted and maintained in the retracted position illustrated by admitting water under ordinary line pressure through the port 482. The piston assembly 458 is maintained in the retracted position in substantially the same manner as described with reference to Fig. 29. When the welding cycle is initiated, water under relatively high pressure is admitted to port 478. This water flows through the annular passageway 474 and axial passageway 476 in piston 462 into chamber 484. The pressure of the water acts on the piston assembly 458 to project the piston downwardly and bring the electrode into contact with the work.

Thereafter, the pressure of this water causes free piston 462 to rise and compress spring 464. When the piston 462 raises a predetermined amount, port 478 is cut off from communication with annular passageway 474 and the pressure of the water is exerted against the top face of piston 472. Piston 472 then moves downwardly; and because of the differential area between the top face of piston 472 and the lower end of the rod portion 470, the pressure in chamber 484 is substantially increased. In this way, the welding pressure exerted by the electrode against the work is relatively high.

The guns shown in Figs. 28, 29 and 30 are designed to be used with other double acting guns described at locations where, because of the thickness of the metal being welded, a higher welding pressure is required than is obtainable with the other guns described.

In Figs. 31 and 32, I have illustrated in a schematic way a welding machine embodying the principles of the present invention. The machine includes a base frame 486 on which is supported a platen 488 that is guided for vertical movement by pins 490. Platen 488 is biased to a lowered position by springs 492. The platen is adapted to be raised to the working position by suitable means such as the air expansible chambers 494. On the platen 488, there are arranged electrodes 496 and 498. Electrodes 496 are supported on platen 488 by a back-up frame 500. Electrode 498 is supported on platen 488 by a back-up bracket generally designated 502.

Above the platen 488, a plurality of welding guns 504 and 506 are mounted on a fixed part 507 of the frame of the welding machine. The welding guns 504 have their axes extending vertically downwardly while the welding guns 506 are adjustably mounted on brackets 508 as by pivots 503 so that their axes are inclined to the vertical. Pivots 503 permit guns 506 to swing on a slight arc. This is necessary to allow the tips of the guns to follow the straight upward movement of platen 488. Guns 504 may be single-acting guns of the type illustrated in Figs. 1 and 7 while guns 506 may be single-acting guns of the spring return type illustrated in Fig. 10. The guns are suitably connected to the two manifolds 510 and 512. All of these guns could also be of the double-acting type. As mentioned previously in the case of double-acting guns manifold 510 is preferably located at a level below the guns.

In the case of the single-acting guns, platen 488 is moved upwardly so that the work supported on lower electrodes 496 contacts the electrodes of guns 504 and forces the pistons of these guns upwardly to create the welding pressure. In the case of double-acting guns, the platen 488 may also move upwardly; but since the electrodes of the guns are projected downwardly hydraulically, the upward movement of the platen 488 would not be relied upon for creating the welding pressure. Guns 506 are utilized for forming spot welds on a portion of the panel being welded that lies in a plane inclined to the plane on which the spot welds are formed by the guns 504. The proper positioning of lower electrode 498 is made readily feasible by the construction of the back-up bracket 502.

The bracket consists of a base plate 514 on which are mounted a pair of upright tubular members 516. Within the tubular members 516, there are arranged sleeves 518. Sleeves 518 are telescopically arranged within tubular members 516 and support the electrode base 520 by means of balls 522 secured to pads 524. In adjusting the bracket 502, the electrode base 520 is disposed in the desired inclined position by raising and lowering the two sleeves 518 in the tubular members 516. When the electrode base 520 is located in the desired plane, an arc weld is laid around the upper ends of the members 516 to secure the sleeves 518 in place. Thereafter, the weld bead is laid around the upper ends of sleeves 518 to permanently connect the electrode base 520 with the sleeves 518.

Figure 34:
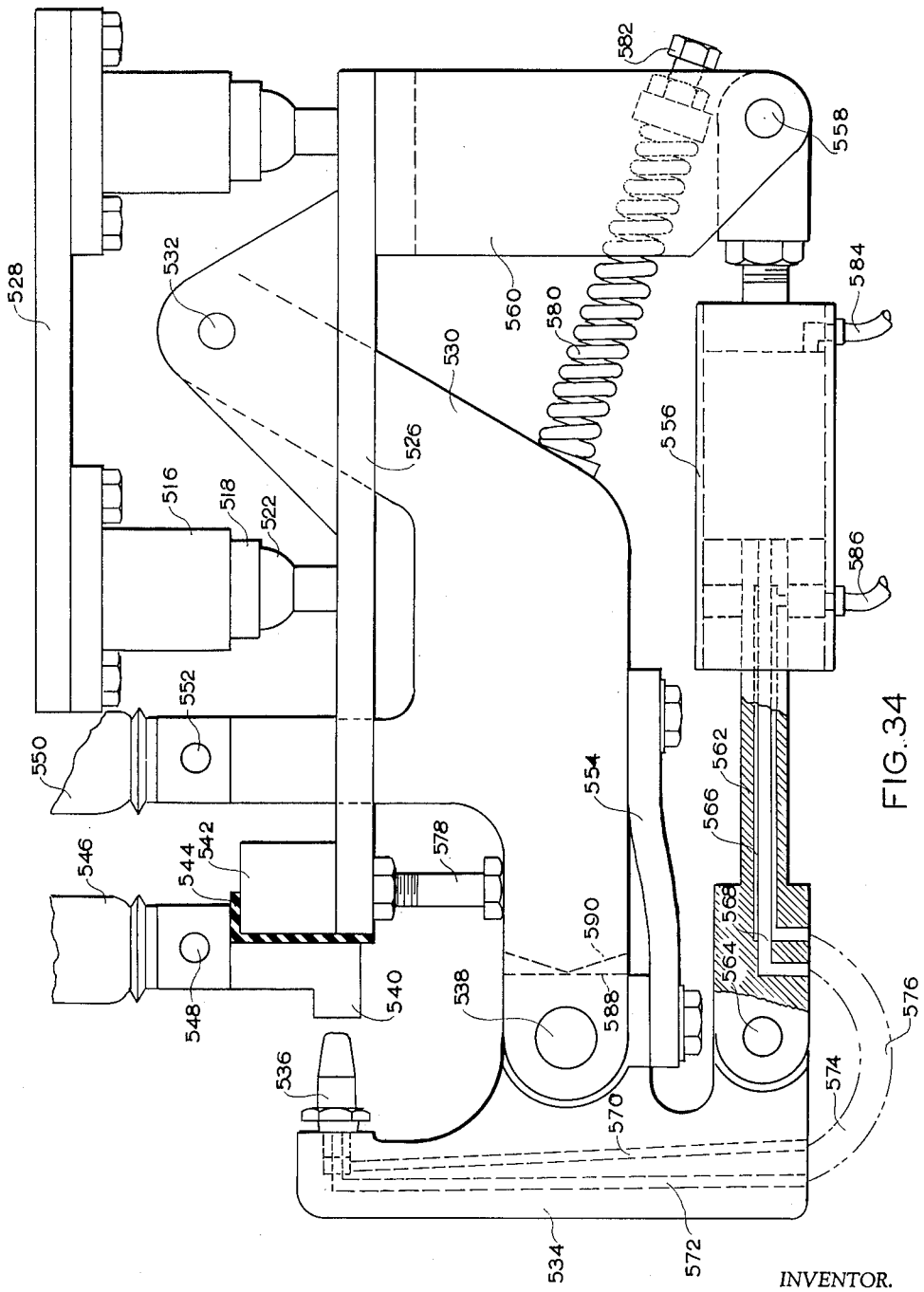
Fig. 34 is a side elevational view, partly in section, illustrating the manner in which the guns of the present invention can be utilized in a rocker arm type of welding machine.

The welding guns of the present invention are not limited in their application to the direct-acting type shown in Figs. 31 and 32. They may also be incorporated in machines of the rocker arm type such as illustrated in Fig. 34. In the arrangement shown in Fig. 34, a base plate 526 is mounted on a fixed frame portion 528 of the machine by means of the tubular members 516, sleeves 518 and balls 522 in the same manner as described above with reference to Figs. 31 through 33. A first rocker arm 530 is pivotally mounted on the base plate 526 as at 532. A second rocker arm 534 carrying an electrode 536 is pivotally mounted on the rocker arm 530 as at 538.

The other electrode of the machine, designated 540, is mounted on a block 542 supported on base plate 526 and is insulated therefrom by means of the insulator 544. One of the welding cables 546 is connected to electrode 540 as at 548. The other welding cable 550 is connected to rocker arm 530 as at 552. The two rocker arms are electrically connected by the jumper 554. A welding cylinder 556 has one end thereof pivotally connected as at 558 with a depending bracket 560 on base plate 526. The piston rod 562 associated with cylinder 556 is pivotally connected to the rocker arm 534 as at 564.

The cylinder and piston assembly in this arrangement may be similar to any of the previously described double-acting guns. However, the water passageways in the piston rod which comprise the axial passageway 566 and the tube 568 are connected with the coolant passageways 570 and 572 in the rocker arm 534 by means of flexible conduits 574 and 576. The passageways 570 and 572 in rocker arm 534 extend to the electrode 536 in the conventional manner. Pivotal movement of rocker arm 530 in a clockwise direction as viewed in Fig. 34 is limited by an adjustable stop 578. The rocker arm 530 is biased into engagement with stop 578 by a spring 580, the tension of which is adjustable by means of screw 582.

In operation, when water under relatively high pressure is introduced into cylinder 556 as through the conduit 584, the piston rod 562 is projected outwardly of cylinder 556 to rock arm 534 in a clockwise direction and thereby cause the electrode 536 to exert the necessary welding pressure against the panel located against the electrode 540. When the piston rod 562 is retracted as by admitting water under ordinary line pressure to the cylinder through the conduit 586, the first movement that occurs is the counterclockwise pivoting of arm 534 about the pivot 538. This causes the electrode 536 to retract from the work positioned against electrode 540.

Thereafter, a stop face 588 on arm 534 engages a stop face 590 on arm 530 to prevent further relative rotation between arms 534 and 530. Further retraction of the piston rod 562 will then cause arm 530 to swing counterclockwise about the pivot 532 against the tension of spring 580. With this arrangement, it will be appreciated that the electrode 536 can be caused to move out and away from the panel being welded to permit unloading with a minimum required of clearance.

Figure 35:
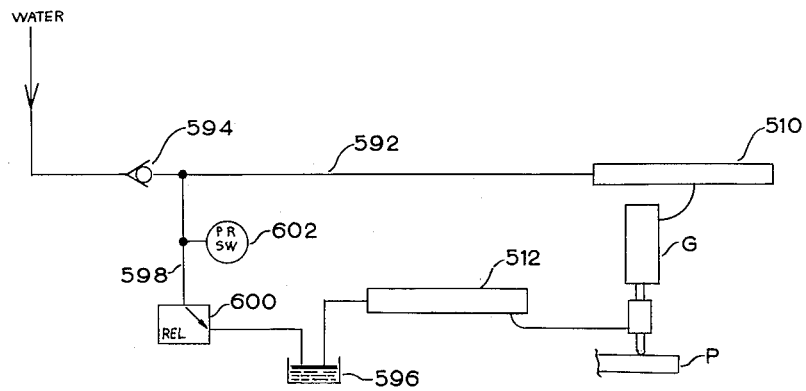

Having thus described the guns of the present invention and welding guns embodying these guns, I shall now describe the circuits which will illustrate the manner in which the guns are actuated. The simplest form of circuit is shown in Fig. 35. In this circuit, the welding gun G which is of the single-acting type shown in Figs. 1 and 6 has the head end of its cylinder connected to manifold 510 and its piston rod end connected to the manifold 512. Manifold 510 is connected with a source of water at ordinary line pressure, that is, at conventional city pressure of about forty pounds per square inch, by a conduit 592 through a check valve 594. Manifold 512 discharges into a sump 596. Conduit 592 also connects with sump 596 through a branch conduit 598 and a relief valve 600. A pressure switch 602 is connected into branch conduit 598. Pressure switch 602, when actuated, is adapted to energize a timer in the welding circuit to control the flow of welding current through the electrode. Pressure switch 602 is set so as to initiate the flow of welding current when the water pressure in line 598 reaches a value which produces the desired welding pressure at the electrode tip. Relief valve 600 is initially set to open at a pressure slightly higher than the setting of pressure switch 602.

In the case of the single-acting guns illustrated in Figs. 1 and 6, when the main switch of the machine, not illustrated, is actuated, the platen P of the welding machine rises. It contacts the electrode of the welding gun and causes the piston within the gun G to rise. As explained in connection with the guns illustrated in Figs. 1 and 6, when the pistons of these guns rise, the pressure of the water above the piston is substantially increased by reason of the closing of check valve 26 in the gun of Fig. 1 or the restriction 114 in the gun of Fig. 6. This increase in pressure which is transmitted through manifold 510 and conduit 592 causes check valve 594 to close. As the platen P continues to move upwardly, the pressure in manifold 510, and thus the pressure between the electrode and the platen, continues to rise. When the pressure in branch conduit 598 rises to a value corresponding to the setting of pressure switch 602, the welding current is caused to flow and thereby effect a weld. The pressure increases to a value slightly higher than the setting of pressure switch 602 at which point it is relieved by relief valve 600.

Figure 36:
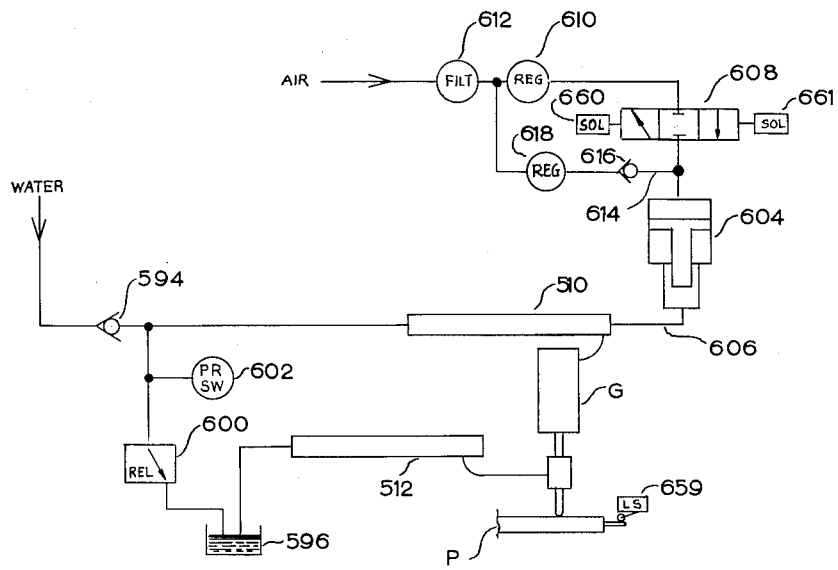

The circuit shown in Fig. 36 is very similar to that shown in Fig. 35. However, in the circuit shown in Fig. 36, means are provided for producing a follow-up of the electrode. These means include a booster 604, one side of which is connected by a conduit 606 with manifold 510. The other side of booster 604 is connected to a source of air under relatively high pressure through a two-position solenoid valve 608, an air regulator 610 and an air filter 612. Booster 604 is also connected with the air source through a by-pass conduit 614 which includes a check valve 616 and an air regulator 618. Conduit 614 connects with the source of air between filter 612 and regulator 610. Regulator 610 is adjusted to supply relatively high pressure while regulator 618 is adjusted to supply a relatively low air pressure.

Figure 37:
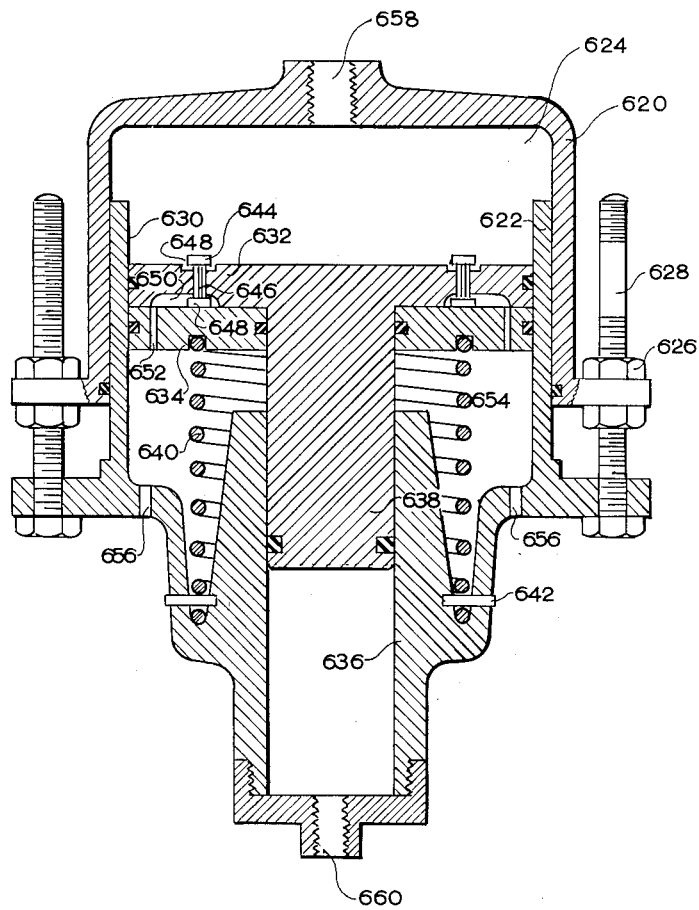
Fig. 37 is a view in axial section of one form of booster usable in the welding systems of the present invention.

Booster 604 can be constructed as shown in Fig. 37 or as shown in Figs. 38 and 39. In the arrangement shown in Fig. 37, the booster comprises two telescoping cylinders 620 and 622 which define an air chamber 624 the size of which can be varied by means of the adjusting nuts 626 on the screws 628. The inner cylinder 622 is provided with a large bore 630 which slidably receives pistons 632 and 634. Inner cylinder 622 is also provided with a reduced bore 636 in which is slidably arranged a plunger 638 formed integrally with piston 632. Piston 634 is a free floating piston which is normally biased to the position shown by a spring 640 connected at its lower end to the cylinder 622 as by pins 642 and also fixedly connected at its upper end to the lower face of piston 634 by means not illustrated. Piston 632 is provided with a plurality of valve members 644 that are formed with axial grooves 646 between enlarged heads 648 at the upper and lower ends thereof (see Fig. 39). The underside of piston 632 is provided with an annular groove 650 which communicates with a vent passageway 652 in piston 634. The chamber 654 below piston 634 is open to atmosphere through the vent ports 656.

With the pistons in the position shown in Fig. 37, the valves 644 are open and chamber 624 is therefore in communication with chamber 654. When pistons 632 and 634 are separated so that valves 644 can seat and close either by reason of gravity or by increased air pressure in chamber 624, communication between chambers 624 and 654 is cut off. Outer cylinder 620 is provided with a port 658 which, as shown in Fig. 36, is connected with the solenoid air valve 608. Inner cylinder 622 is provided with a port 660 at the lower end of the reduced bore 636 to which conduit 606 is connected.

In the operation of the system shown in Fig. 36, valve 608 is normally positioned in neutral or closed position and air at relatively low pressure flows into chamber 624 through valve 644, vent passageway 652, chamber 654 and to atmosphere through ports 656. This low pressure air will be sufficient to maintain piston 632 down against piston 634, overcoming the normal line pressure of the water in bore 636 while the machine is idling. The flow of free air through chamber 624 will cool the air in this chamber and prevent an appreciable rise in temperature that might otherwise occur because of the repeated compression of air in chamber 624 during periods of high production.

When the welding cycle is initiated, platen P rises, contacting the electrode of each gun G and moving it upwardly so that the pressure in manifold 510 is increased. This causes check valve 594 to close. When the platen P reaches a predetermined upper position, it trips limit switch 659 which in turn energizes solenoid 660 to shift valve 608 to a position wherein chamber 624 is connected with the high-pressure air source. However, at this time, valves 644 will have been closed because piston 632 will have been raised by the action of the increased pressure in the reduced bore 636. The high pressure in chamber 624 closes check valve 616 in the by-pass line 614 and since the passageways controlled by valves 644 are of relatively small size, this high pressure will force the piston 632 down carrying piston 634 with it and compressing spring 640.

The downward movement of pistons 632 and 634 past the idle position illustrated in Fig. 37 by compressing spring 640 assures full pressure in the hydraulic lines to a welding system employing a large number of guns. When the number of guns is relatively small the cylinder members 620, 622 are adjusted to provide a relatively small air chamber 624 and the upward movement of piston 632 will thus compress the air in this chamber at a relatively fast rate. This assures instant response at the guns to the compressed air admitted by solenoid valve 608. The arrangement shown in Fig. 37 thus permits the use of a booster of relatively small size in welding systems employing a large number of guns. It will be observed that the booster does not serve to bring the electrodes into contact with the work. It serves to apply the required welding pressure at the electrodes and produce the necessary follow-up required for production of sound welds.

When high pressure air is admitted to port 658 the differential areas of pistons 632 and plunger 638 produce a relatively high pressure in manifold 510 which acts upon the upper end of the piston in gun G to produce the desired welding pressure at the electrode. If the desired welding pressure is the maximum pressure that is produced by the booster 604, then the relief valve 600 can be eliminated because the welding pressure will never be exceeded. However, if the pressure developed by the booster is in excess of the desired welding pressure, then relief valve 600 will bleed water to sump 596 when the pressure in manifold 510 slightly exceeds the setting of pressure switch 602.

When the weld is completed, platen P will start moving down, again tripping limit switch 659 which then deenergizes solenoid 660 and energizes solenoid 661, to shift valve 608 to a position wherein the air chamber of the booster is open to atmosphere. The pressure of the water in manifold 510 and in the cylinder of the gun is thus relieved. When the platen P reaches the lower end of its stroke, it trips a second limit switch 663 which deenergizes solenoid 661 and shifts the valve to the neutral position shown. At this time, low-pressure air from the by-pass line 614 is directed to the air chamber of the booster, which low-pressure air serves to cool the air chamber and insure the downward movement of piston 632 to a piston wherein it engages piston 634.

The booster shown in Figs. 38 and 39 is somewhat similar to that illustrated in Fig. 37, but it has a shorter stroke and therefore is not capable of accommodating as many welding guns as is the booster shown in Fig. 37. The booster shown in Fig. 38 comprises an outer cylinder 662 and an inner cylinder 664 adjustably connected together by nuts 666 and screws 668. These two cylinders define a chamber 670 in which is slidably arranged a piston 672 having a reduced plunger portion 674 arranged within the reduced bore 676 of inner cylinder 664. Piston 672 is provided with a plurality of the valves 644, and the underside of piston 672 is open to atmosphere through the vent passageway 678.

The operation of the system shown in Fig. 36 using the booster of Fig. 38 is the same as previously described with reference to the booster shown in Fig. 37. With each of these boosters, it will be observed that the air in the air chamber is cooled between successive welding cycles so that there will be no tendency for the pressure in the air chamber to progressively increase by reason of the heat generated. If desired, the system illustrated in Fig. 36 can be used with a conventional booster or accumulator, in which case the by-pass line 614 with the check valve 616 and air regulator 618 would be eliminated from the system.

Figure 40:
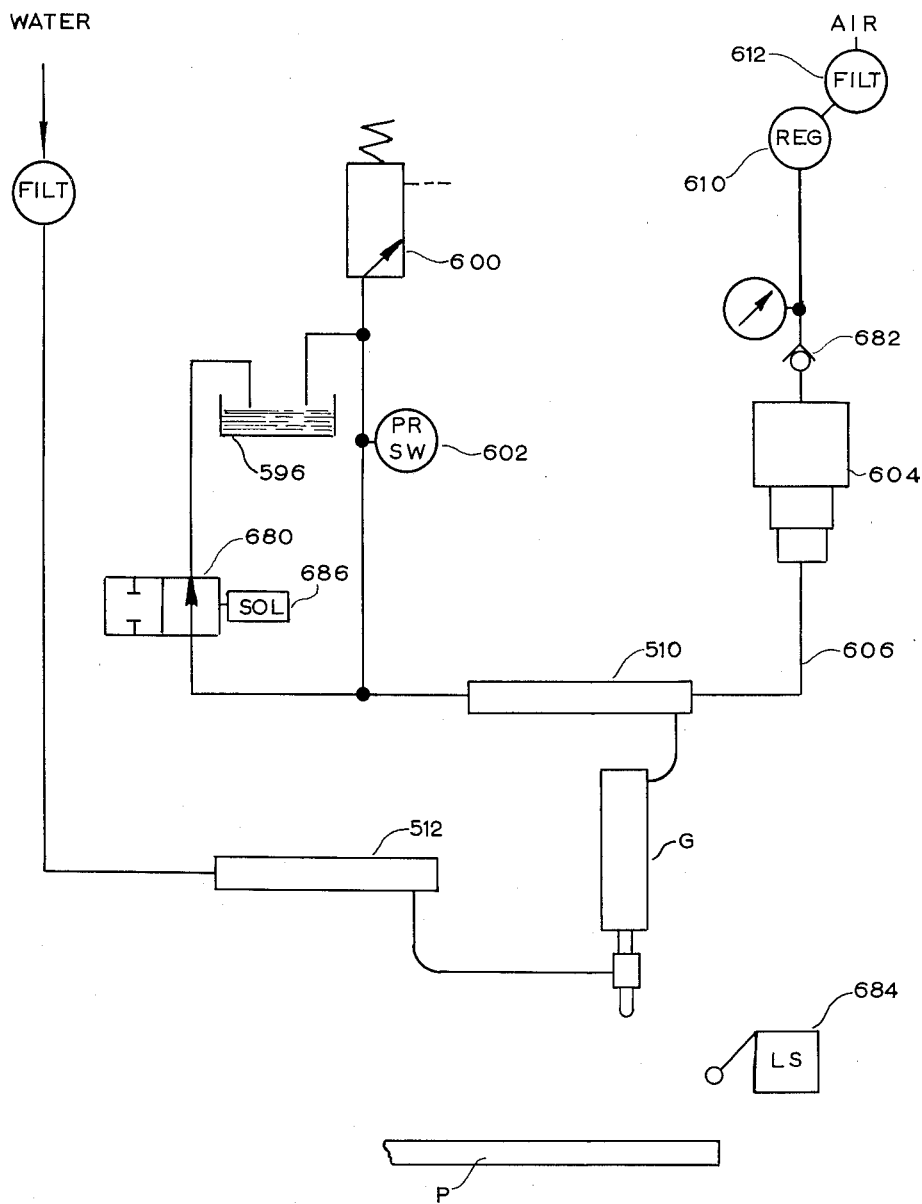

The system shown in Fig. 40 is also designed to use singe-acting guns wherein the piston is provided with the simple gravity-operated ball check shown in Figs. 20 and 21. In this arrangement, water is directed from the water source at conventional line pressure to the manifold 512 and then to the lower end of the welding gun. The water cools the electrode and passes up through the gun to the manifold 510 and from the manifold 510, it is directed to the sump 596 through the two-position solenoid valve 680. The lower end of a booster or accumulator 604 is also connected with manifold 510 by the conduit 606. The air chamber of booster 604 connects with an air source through the filter 612, air regulator 610 and check valve 682.

When the welding cycle is initiated, platen P moves upwardly; and on the upstroke of the platen, it trips a limit switch 684 which actuates solenoid 686 to shift valve 680 to a position wherein the flow of water to manifold 512 is shut off and manifold 510 is connected to sump 596 only through the relief valve 600. When the flow of water to the lower end of the gun stops, the ball check of the type shown in Figs. 20 and 21 closes; and as the platen P moves the electrode upwardly, the pressure of the water in manifold 510 is progressively increased. Eventually, this pressure will reach the setting of pressure switch 602 so that the welding current will be caused to flow. In this arrangement, the booster 604 will provide follow-up for the electrode because check valve 682 closes when the piston of the gun is displaced upwardly by the platen P.

After the welding cycle is completed, platen P moves downwardly, again tripping limit switch 684 to deenergize solenoid 686 and re-establish the flow of cooling water up through the gun from the manifold 512 to the manifold 510.

Figure 41:
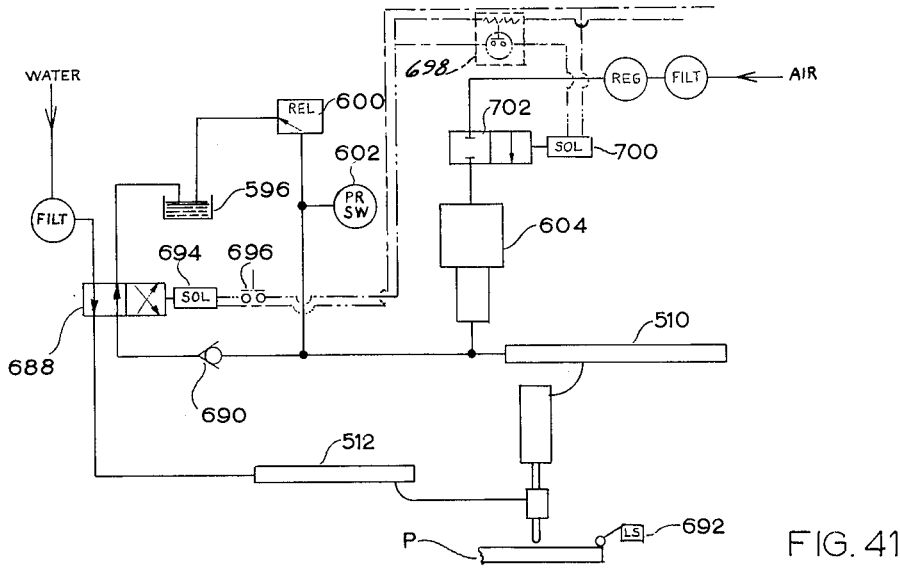

The system shown in Fig. 41 is designed for welding guns wherein the piston is normally retracted such as the guns illustrated in Figs. 12, 17 and 19. In this arrangement, the water normally flows at line pressure through the valve 688 to the manifold 512 and from the manifold 512 to the tip of the gun to cool the electrode. In the case of guns of the type shown in Figs. 12, 17 and 19, the flow of water upwardly through the gun also serves to retain the electrode in the retracted position. From the upper end of the gun, the water flows into manifold 510 and from this manifold through a check valve 690 which is biased to remain open at the line pressure. The water then flows through valve 688 to the sump 596.

When the welding cycle is initiated, the platen P moves upwardly; and at the upper end of its stroke, it trips a limit switch 692 which closes a circuit through the solenoid 694 through contacts 696. The energizing of solenoid 694 shifts valve 688 to reverse the flow of water so that the water at line pressure then flows downwardly through the gun from manifold 510 to manifold 512.

In the case of the guns illustrated in Figs. 12, 17 and 19, the flow of water downwardly through the gun causes projection of the electrode into contact with the work. The closing of the circuit through contact 696 also energizes a timer 698 which, after a predetermined time interval, energizes solenoid 700. When solenoid 700 is energized, it shifts valve 702 to a position wherein a source of high-pressure air communicates with the air chamber of booster 604.

The booster 604 then produces a relatively high pressure in manifold 510, causing check valve 690 to close. When the pressure in manifold 510 rises to a pressure corresponding to the required welding pressure at the electrodes, pressure switch 602 initiates the flow of welding current; and when the pressure in manifold 510 tends to exceed the setting of relief valve 600, the water in the line is bled back into sump 596. When the flow of welding current ceases, platen P lowers, tripping limit switch 692, thereby shifting valve 688 to a position where the water at line pressure flows upwardly through the gun to cool the electrode and retract the pistons. At the same time, solenoid 700 is deenergized to cut off communication between the the high pressure air source and the air chamber of booster 604.

It will be appreciated that in the arrangement illustrated in Fig. 41, if the pressure of the air admitted to the air chamber of booster 604 is regulated so that the maximum pressure produced in manifold 510 will correspond to the welding pressure required, then the line containing valve 690 can be eliminated since there will be no occasion for bleeding water back into the sump 596.

Figure 42:
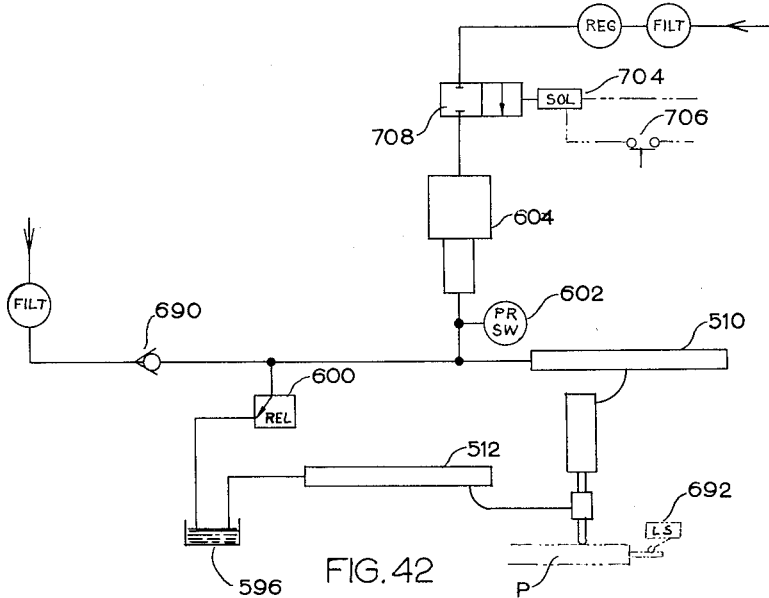

The arrangement illustrated in Fig. 42 is especially designed to accommodate the spring return guns shown in Figs. 10 and 25. In this arrangement, the water at line pressure normally flows to manifold 510, then downwardly through the gun to cool the electrode and then through manifold 512 to sump 596. When the welding cycle is initiated, the platen P moves upwardly; and at the upper end of its stroke, it trips limit switch 692 which closes a circuit through solenoid 704 at contacts 706. Solenoid 704 thus shifts valve 708 to a position wherein the air chamber of booster 604 communicates with the source of high-pressure air.

The action of booster 604 increases the pressure of the water in manifold 510 to project the electrodes of the gun downwardly into contact with the work against the tension of the return springs in the gun. When the pressure of the water in manifold 510 reaches a value corresponding to the welding pressure, pressure switch 602 initiates the flow of welding current through the electrode; and if the pressure in the manifold 510 tends to exceed the welding pressure, water will be bled back into sump 596 through relief valve 600 which, as pointed out previously, is always set to relieve at a pressure slightly higher than the pressure at which pressure switch 602 is set. After the welding cycle is completed, platen P lowers, again tripping switch 692 and opening the circuit to solenoid 704 so as to shut off the flow of high-pressure air to the air chamber of booster 604.

In comparing the systems shown in Figs. 41 and 42, it will be appreciated that by employing the timer 698 in the system shown in Fig. 41, the booster 604 of the system shown in Fig. 41 can be of a relatively small size when used with guns where the pistons are retracted by fluid pressure. This is true because the electrodes will be projected downwardly into contact with the work by the water flowing from the source at line pressure. However, in the arrangement illustrated in Fig. 42, since the flow of water at line pressure from the water source is stopped as soon as limit switch 692 is tripped by the platen, the stroke of booster 604 must be sufficient to supply all the water necessary to project the electrodes of all the guns downwardly into contact with the work. In this case, the use of the booster illustrated in Fig. 37 is preferred.

Figure 44:
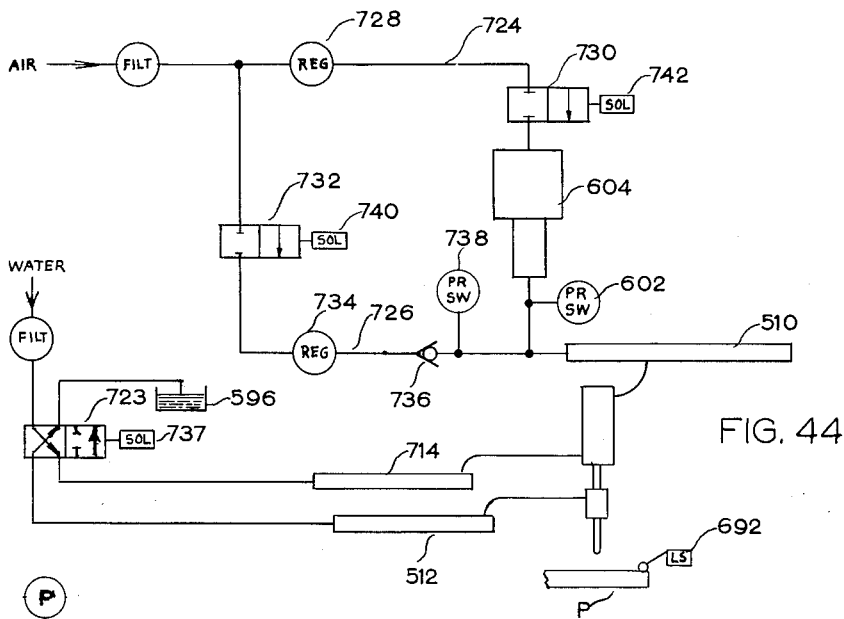

The systems shown in Figs. 43 and 44 are designed for use with the gun shown in Fig. 16 or for use with any of the double-acting guns illustrated when employing the solid type piston shown in Fig. 15. In both of these arrangements, three manifolds are employed. In the arrangement of Fig. 43, the water normally flows at line pressure from the source through filter 710 and through the two-position valve 712 to the manifold 714.

The manifold 714 is connected to the side port in the cylinder of the gun.

In the gun illustrated in Fig. 16, this port is designated 216. In the gun illustrated in Fig. 12 employing the piston shown in Fig. 15, this port would be the port 178. The water from manifold 714 at ordinary line pressure then flows downwardly through the electrode to manifold 512 and from manifold 512 to the sump 596. The head end of the cylinder, that is, the chamber above the pistons of these guns is connected with manifold 510. The supply of high-pressure air to booster 604 is controlled by a valve 716 actuated by a solenoid 718. The energizing of solenoid 718 is controlled by a pressure switch 720. The pressure switch 602 energizes the timer in the welding circuit for controlling the flow of welding current.

When the welding cycle is initiated, the platen P moves upwardly; and at the upper end of its stroke, it trips limit switch 692 which energizes solenoid 722 that controls valve 712. When solenoid 722 is energized valve 712 is shifted to its other position wherein the flow of water at line pressure is then directed to the upper end of the gun through manifold 510. This causes the electrodes of the guns to be projected downwardly into contact with the work and the water in the chambers below the pistons in the guns is exhausted through manifolds 714 and 512 to sump 596. When the electrodes contact the work, pressure switch 720 is actuated to energize solenoid 718 and shift valve 716 to a position wherein the air chamber of booster 604 communicates with the source of high-pressure air.

The action of booster 604 increases the pressure of the water in manifold 510 whereby to close check valve 690. The action of the booster then increases the pressure in manifold 510 to the welding pressure, at which point pressure switch 602 will initiate the flow of welding current through the electrode. If the pressure in manifold 510 continues to rise, the excess water will be bled back from sump 596 to relief valve 600.

After the welding cycle is completed, platen P lowers, again tripping switch 692 to deenergize solenoid 722, and thereby shift valve 712 to a position wherein the water at line pressure is again directed to manifold 714. At this time, the pressure of the water in manifold 510 is relieved and pressure switch 720 deenergizes solenoid 718 to cut off the flow of high-pressure air to the air chamber of booster 604.

The arrangement shown in Fig. 44 is generally similar to that illustrated in Fig. 43 with the exception, however, that in the system of Fig. 44, air pressure instead of water pressure is utilized for producing the necessary welding pressure on the pistons of the welding guns. In this arrangement, water at line pressure normally flows through valve 723 to manifold 714 and into the gun to retract the piston and cool the electrode. The water then flows through manifold 512 and to the sump 596 through valve 723.

In this arrangement, the manifold 510 is in the form of an air manifold and is connected with a source of high-pressure air through a pair of branch lines 724 and 726. Branch line 724 includes a pressure regulator 728, a solenoid actuated air valve 730, a booster 604 and a pressure switch 602. Branch line 726 includes a solenoid actuated air valve 732, a pressure regulator 734, a check valve 736 and a pressure switch 738.

When the welding cycle is initiated, the platen P moves upwardly; and at the upper end of its stroke, it trips limit switch 692 which in turn energizes solenoid 737 of valve 723 and solenoid 740 of valve 732. Manifold 714 is thus connected with sump 596 through valve 723. At the same time, air at relatively low pressure controlled by regulator 734 is caused to flow into manifold 510 and into the upper ends of the guns to project the electrodes downwardly into contact with the work. When the electrodes contact the work, the pressure in manifold 510 actuates pressure switch 738 which in turn energizes solenoid 742 that actuates valve 730. Air at relatively high pressure controlled by regulator 728 is thus admitted to the upper end of booster 604 to thus substantially increase the pressure in manifold 510 which causes check valve 736 to close. When the pressure in manifold 510 reaches the setting of pressure switch 602, the flow of welding current through the electrodes of the guns is initiated.

After the welding cycle is completed, platen P lowers, again tripping switch 692 to deenergize solenoids 737 and 740. The flow of water at line pressure is thus reestablished through manifold 714 to retract the electrodes of the guns and cool them.

Figure 45:
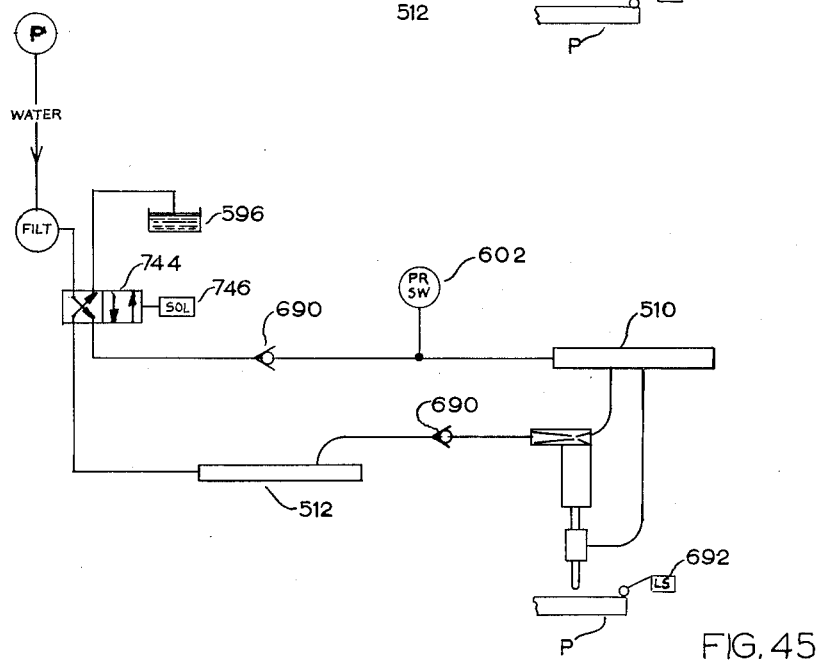

The system shown in Fig. 45 is designed especially for the type of gun illustrated in Fig. 18. In this arrangement, water at line pressure normally flows through valve 744 to manifold 510 which is connected with the inlet of jet nozzle 256. This water flows through the venturi into manifold 512. The water also flows from manifold 510 downwardly to the lower end of the piston rod to cool the electrode and then upwardly through axial passageway 24 so that the electrode is cooled and the piston rod is normally retracted.

When the welding cycle is initiated, platen P moves upwardly; and before it reaches the upper end of its stroke, it trips limit switch 692 which in turn energizes solenoid 746, shifting valve 744 to reverse the flow of water. Water then flows at line pressure into manifold 512 and from manifold 512 to the port 262 of venturi sleeve 258. This produces a projection of the electrodes downwardly. As the platen P moves upwardly into contact with the tips of the electrodes, the pressure in manifold 510 is increased causing check valves 690 to close. When the pressure in manifold 510 reaches a value corresponding to the welding pressure required, pressure switch 602 initiates the flow of welding current through the electrodes.

When the welding cycle is completed, platen P lowers, deenergizing solenoid 746 and the flow of water at line pressure is re-established for cooling the electrode and retracting the pistons of the guns.

In Fig. 46, I have illustrated in a diagrammatic way, the manner in which the double-acting gun with the built-in booster illustrated in Fig. 27 is connected into the hydraulic circuit of the machine. As is shown in Fig. 46, port 398 is connected by a conduit 748 with the manifold 512 which is normally connected with the water at ordinary line pressure. The exhaust port on the piston is connected by a conduit 750 through a check valve 752 with the manifold 510 which normally exhausts to the sump 596.

When the welding cycle is initiated, the flow of water is reversed so that manifold 512 connects with the sump 596; and a source of water under high pressure produced by booster 604, for example, is connected with manifold 510. Manifold 510 is in turn connected by a conduit 754 with the inlet port 368 of the venturi 370. The admission of water under relatively high pressure into manifold 510 causes check valve 572 to close, and the gun operates in the manner previously described.

I claim:

1. An electrical resistance welding gun comprising a cylinder, a piston movable in the cylinder in response to a pressure differential on opposite sides thereof, a rod connected with the piston and projecting axially out one end of the cylinder, a welding electrode operably connected with the outer end of the rod, said rod having an axial passageway therein, said electrode having a coolant passageway therein communicating at one end with the axial passageway in the rod and communicating at its other end with an external port in the gun, said axial passageway also communicating with the chamber at the rod end of the cylinder, means for connecting said chamber with a source of water under relatively low pressure and said external port with exhaust so that the liquid from said source is effective to normally retract the piston rod and to cool the electrode and means for connecting the chamber at the head end of the cylinder with a source of fluid at relatively high pressure.

2. An electrical resistance welding gun comprising a cylinder, a piston movable axially in the cylinder in response to a pressure differential on opposite sides thereof, a rod connected with the piston and projecting axially from one end of the cylinder, a welding electrode, means operably connecting the welding electrode to the projecting end of the rod, said rod having an axial passageway therein communicating with the chamber at the head end of the cylinder, said electrode having a coolant passageway therein communicating with said axial passageway and with an external port on the cylinder, a venturi passageway at the head end of the cylinder, the throat of said venturi passageway communicating with said chamber at the head end of the cylinder by means of a bleed passageway such that when liquid under pressure is directed through said venturi passageway in one direction, the pressure at said bleed passageway is reduced to decrease the pressure in the head chamber of the cylinder and thereby exert a force on the piston in a direction causing retraction of the rod, said venturi passageway also communicating with said coolant passageway and said axial passageway.

3. An electrical resistance welding gun as called for in claim 2 wherein the outlet end of said venturi passageway is connected with said exhaust port.

4. An electrical resistance welding gun as called for in claim 3 including means operable to connect said outlet of the venturi passageway with a source of liquid under pressure.

5. An electrical resistance welding gun comprising a cylinder, a piston movable axially in the cylinder in response to a pressure differential on opposite sides thereof, a rod connected with the piston and projecting axially out one end of the cylinder, a second piston in said cylinder arranged between the first piston and the head end of the cylinder, said second piston having different effective areas on opposite ends thereof, the end of larger area being adjacent the head end of the cylinder and the end of smaller area being disposed adjacent the first mentioned piston, means defining an intermediate chamber in the cylinder between the two pistons, a passageway connecting said intermediate chamber with the chamber at the head end of the cylinder, means biasing the second piston toward the head end of the cylinder, means for introducing liquid under pressure to said connecting passageway and an electrode mounted on the projecting end of the rod.

6. An electrical resistance welding gun as called for in claim 5 including valve means for placing said connecting passageway and said intermediate chamber out of communication when the pressure in said connecting passageway rises to a value sufficient to overcome the biasing means acting on the second piston.

7. An electrical resistance welding gun as called for in claim 6 wherein said valve means comprises a pressure responsive valve in said passageway.

8. An electrical resistance welding gun as called for in claim 6 wherein said valve means comprises a portion of said second piston.

9. An electrical resistance welding gun as called for in claim 8 including a bushing in said cylinder surrounding the smaller end of said second piston, said connecting passageway extending in part through said bushing to the bore thereof, said second piston, when moved against the force of said biasing means, closing said connecting passageway at the bore of said bushing.

10. An electrical resistance welding gun as called for in claim 5 wherein said electrode has a coolant passageway therein, said rod having an axial passageway communicating with said coolant passageway and with said intermediate chamber and means for controlling the flow of liquid between said axial passageway and said intermediate chamber.

11. An electrical resistance welding gun as called for in claim 10 wherein said coolant passageway communicates with the chamber in said cylinder between the rod end of the cylinder and the first piston, said cylinder having an external port thereon communicating with said last mentioned chamber and means for alternately connecting said connecting passageway and said port one with said source of liquid under pressure and the other with exhaust.

12. An electrical resistance welding gun comprising a cylinder, means dividing the cylinder into two axially spaced chambers, a piston in each chamber, a rod interconnecting the two pistons and projecting axially out one end of the cylinder, a port at the head end of the cylinder communicating with the chamber sections on the side of each piston adjacent the head end of the cylinder such that when fluid under pressure is directed to said port, said rod is projected, a port on said cylinder communicating with the chamber section on the other side of at least one of said pistons such that when liquid under pressure is directed to said last mentioned port, the rod is retracted, said rod having an axial passageway therein communicating with said last mentioned chamber and an electrode having a coolant passageway therein communicating with said axial passageway, said electrode being operatively connected with the outer end of said rod.

13. In a welding organization, the combination of a welding gun comprising a cylinder, a piston movable in the cylinder in response to a pressure differential on opposite sides of the piston, a piston rod connected to the piston and projecting axially out one end of the cylinder, an electrode operably connected with the projecting end of the rod, a coolant passageway extending from the head chamber of the cylinder through the piston, the rod and the electrode to the chamber at the rod end of the cylinder, a source of water under relatively low pressure connected with the chamber at the rod end of the cylinder for directing water to the electrode, the rod and the piston to the chamber at the head end of the cylinder, said passageway having means therein forming a restriction so that the pressure of the water in the chamber at the rod end of the cylinder normally holds the rod in a retracted position and the electrode out of contact with the work piece, means for stopping the flow of water from said source to the chamber at the rod end of the cylinder and for increasing the water pressure in the chamber at the head end of the cylinder to a value such that the electrode is brought to bear against the work piece with the desired welding pressure.

14. The combination called for in claim 13 wherein said means for increasing the pressure in the chamber at the head end of the cylinder comprises a pressure booster connected with the head chamber of the cylinder.

15. The combination called for in claim 13 wherein said means for stopping the flow of water to the chamber at the rod end of the cylinder comprises a valve shiftable to connect said source of water with the chamber at the head end of the cylinder.

16. The combination called for in claim 13 wherein said means for stopping the flow of water to the chamber at the rod end of the cylinder comprises a valve means actuatable to reverse the flow of water through the cylinder and said means for increasing the pressure in the chamber at the head end of the cylinder comprises a pressure booster communicating with the chamber at the head end of the cylinder.

17. The combination called for in claim 16 including a work supporting platen movable toward and away from the electrode and means responsive to the movement of the platen toward the electrode to a predetermined position for actuating said valve means and booster.

18. The combination called for in claim 17 wherein said last mentioned means are arranged to actuate said valve means and said booster sequentially whereby the electrode is projected toward the work before the booster is actuated.

19. The combination called for in claim 17 including a check valve in the line between the head end of the cylinder and said source for preventing the flow of water in said line to said source when the booster increases the pressure in said chamber at the head end of the cylinder to a value above the pressure of said source.

20. In a welding organization, the combination of a welding gun comprising a cylinder, a piston movable in the cylinder in response to a pressure differential on opposite sides thereof, a rod connected with the piston and projecting axially out one end of the cylinder and an electrode operably connected with the outer end of said rod, said electrode having a coolant passageway therein communicating at one end with the chamber at the rod end of the cylinder, the opposite end of said coolant passageway having an exhaust line connected thereto, a source of water under relatively low pressure, valve means for optionally connecting said water source with either the chamber at the head end of the cylinder to project the rod outwardly of the cylinder or with the chamber at the rod end of the cylinder to retract the rod.

21. The combination called for in claim 20 wherein said valve means are arranged to connect the chamber at the head end of the cylinder to exhaust when said source is connected to the chamber at the rod end of the cylinder and to connect the chamber at the rod end of the cylinder to exhaust when the source is connected to the chamber at the head end of the cylinder.

22. The combination called for in claim 21 including a platen movable in a direction toward and away from the electrode and means operated by said platen to control the actuation of said valve means.

23. The combination called for in claim 21 including a booster communicating with the head end of the cylinder for increasing the pressure in the chamber at the head end of the cylinder to a value substantially greater than said source.

24. The combination called for in claim 20 wherein said booster is normally out of communication with the chamber at the head end of the cylinder and means responsive to an increase in pressure in the chamber at the head end of the cylinder to a predetermined value for placing the booster in communication with the chamber at the head end of the cylinder.

25. The combination called for in claim 24 including a check valve in the line extending from the chamber at the head end of the cylinder to said source for preventing the flow of water from the chamber at the head end of the cylinder to said source when the pressure in the chamber at the head end of the cylinder exceeds a predetermined value.

26. In a welding organization, the combination of a welding gun comprising a cylinder, a piston movable in the cylinder in response to a pressure differential on opposite sides thereof, a piston rod connected with the piston and projecting axially out one end of the cylinder and an electrode operably connected with the outer end of the rod, said electrode having a coolant passageway therein communicating at one end with the chamber at the rod end of the cylinder, a source of water at relatively low pressure, a source of air under pressure, valve means normally connecting said source of water with the chamber at the rod end of the cylinder and normally connecting the other end of said coolant passageway with exhaust and normally placing the chamber at the head end of the cylinder out of communication with said source of air and means for actuating said valve means for connecting said source of air to the chamber at the head end of the cylinder and for connecting the chamber at the rod end of the cylinder with exhaust.

27. The combination called for in claim 26 including a pressure booster connected with the chamber at the head end of the cylinder and means for actuating said booster in response to an increase in pressure in the chamber at the head end of the cylinder to a predetermined value above said source of air.

28. An electrical resistance welding gun comprising a cylinder, a piston movable within the cylinder in response to a pressure differential on opposite sides thereof, a rod connected to the piston and projecting axially out one end of the cylinder, an electrode operably connected with the free end of the piston rod, said rod having an axial passageway therein communicating at one end with the chamber at the head end of the cylinder, said electrode having a coolant passageway therein connected at one end with the axial passageway in the rod, the other end of the coolant passageway in the electrode communicating with the chamber at the rod end of the cylinder, means for alternately connecting the chamber at the rod end of the gun to a source of liquid coolant at relatively low pressure and exhaust and said chamber at the head end of the gun to exhaust and to a source of hydraulic fluid at relatively high pressure, respectively.

29. An electrical resistance welding gun as called for in claim 28 including restrictor means on said rod for preventing the free flow of high pressure fluid from the chamber at the head end of the gun into said axial passageway in the rod.

30. An electrical resistance welding gun as called for in claim 28 including a deflector tube mounted on said rod and extending axially through said axial passageway in the rod and into the coolant passageway in the electrode, said deflector tube being spaced from the wall of said axial passageway to form a space therebetween which communicates directly with the chamber at the rod end of the cylinder and communicates with the chamber at the head end of the cylinder through said deflector tube.

31. An electrical resistance welding gun as called for in claim 30 wherein said space communicates with the chamber at the rod end of the gun at a point adjacent said piston.

32. An electrical resistance welding gun as called for in claim 30 wherein said space communicates with the chamber at the rod end of the gun at a point adjacent the rod end of the cylinder such that said communication is cut off when the rod is projected from the cylinder a short extent.

33. An electrical resistance welding gun as called for in claim 30 including means forming a restriction to the free passage of hydraulic fluid from said chamber at the head end of the cylinder into said deflector tube.

34. An electrical resistance welding gun as called for in claim 33 wherein said restriction means comprises a check valve.

35. In a welding organization, the combination of a source of coolant liquid under relatively low pressure, a welding gun including a cylinder, a piston movable in the cylinder in response to a pressure differential on opposite sides thereof, a rod connected with the piston and projecting out one end of the gun, an electrode operably connected with said rod, said electrode having a coolant passageway therein, said rod having an axial passageway therein communicating with the chamber at the head end of the cylinder at one end and with the coolant passageway in the electrode at its other end, a liquid line connecting the chamber at the head end of the cylinder with said liquid source, a liquid line connecting the coolant passageway in the electrode with exhaust, means forming a restriction for preventing free flow of liquid from the chamber at the head end of the gun into said axial passageway in the rod, whereby said electrode is normally biased by the liquid flowing through said first mentioned liquid line in a direction projecting from the cylinder, a work supporting platen movable in opposition to the projecting direction of movement of the electrode and adapted to cause retraction of the electrode, valve means in said first mentioned liquid line adapted to close in response to retraction of the electrode under the influence of said platen to thereby trap liquid between said valve means and said restriction means and means for moving the platen with sufficient force in opposition to the projecting movement of the electrode to bear against a work piece on the platen with a desired welding pressure.

36. A welding organization as called for in claim 35 wherein said restriction means comprises a check valve.

37. A welding organization as called for in claim 36 wherein said valve means and said restriction means each comprise check valves.

38. A welding organization as called for in claim 35 including a pressure booster communicating with the first mentioned liquid line at a point between said valve means and said restriction means.

39. A welding organization as called for in claim 35 including a pressure booster communicating with the first mentioned liquid line between said valve means and said restriction means and means controlled by the movement of the platen in opposition to the projecting movement of the electrode for actuating said pressure booster.

References Cited in the file of this patent

UNITED STATES PATENTS

| | | |
|---|---|---|
| 1,273,203 | Thomson | July 23, 1918 |
| 1,672,702 | Weed | June 5, 1928 |
| 2,057,794 | Sorenson et al. | Oct. 20, 1936 |
| 2,063,258 | Martin | Dec. 8, 1936 |
| 2,266,424 | Humphrey | Dec. 16, 1941 |
| 2,295,925 | Biederman et al. | Sept. 15, 1942 |
| 2,298,051 | Gordon et al. | Oct. 6, 1942 |
| 2,368,550 | Kruitbosch | Jan. 30, 1945 |
| 2,374,348 | Harding | Apr. 24, 1945 |
| 2,442,798 | Crabtree | June 8, 1948 |
| 2,447,113 | Candy | Aug. 17, 1948 |
| 2,457,606 | Senn | Dec. 28, 1948 |
| 2,496,104 | Paner | Jan. 31, 1950 |
| 2,714,150 | Kaiser | July 26, 1955 |